(12) United States Patent
Mehmi et al.

(10) Patent No.: US 11,717,766 B2
(45) Date of Patent: Aug. 8, 2023

(54) SYSTEMS AND METHODS FOR GENERATING POTABLE WATER

(71) Applicant: AQUA-BELT TECHNOLOGIES, LLC, Mountain House, CA (US)

(72) Inventors: Ramandeep Mehmi, Tracy, CA (US); Anil D. Jha, San Francisco, CA (US); John S. Swartley, Fairfield, CT (US); Edward Arthur Smallhorn, Dartmouth (CA)

(73) Assignee: AQUA-BELT TECHNOLOGIES, LLC, Mountain House, CA (US)

( * ) Notice: Subject to any disclaimer, the term of this patent is extended or adjusted under 35 U.S.C. 154(b) by 964 days.

(21) Appl. No.: 16/349,904

(22) PCT Filed: Nov. 15, 2017

(86) PCT No.: PCT/US2017/061780
§ 371 (c)(1),
(2) Date: May 14, 2019

(87) PCT Pub. No.: WO2018/093885
PCT Pub. Date: May 24, 2018

(65) Prior Publication Data
US 2020/0078701 A1 Mar. 12, 2020

Related U.S. Application Data

(60) Provisional application No. 62/422,871, filed on Nov. 16, 2016.

(51) Int. Cl.
*B01D 1/14* (2006.01)
*B01D 3/34* (2006.01)
(Continued)

(52) U.S. Cl.
CPC ............... *B01D 1/14* (2013.01); *B01D 3/343* (2013.01); *B01D 5/006* (2013.01); *C02F 1/283* (2013.01);
(Continued)

(58) Field of Classification Search
CPC .......... B01D 1/14; B01D 3/343; B01D 3/346; B01D 5/006; B01D 19/0031;
(Continued)

(56) References Cited

U.S. PATENT DOCUMENTS 4,976,824 A 12/1990 Lee
2008/0289495 A1 11/2008 Eisenberger et al.
(Continued)

FOREIGN PATENT DOCUMENTS

CN 1597540 A 3/2005
CN 101481154 B 11/2010
(Continued)

OTHER PUBLICATIONS

International Search Report and Written Opinion for corresponding PCT/US2017/061780, dated Jan. 25, 2018.
(Continued)

*Primary Examiner* — Brian A McCaig
(74) *Attorney, Agent, or Firm* — Lando & Anastasi, LLP

(57) ABSTRACT

A system for generating potable water from source water contains an enclosed vessel, a heating unit, an air distributor, a condenser, and a collection vessel. A method for generating potable water from source water includes heating ambient air, bubbling heated air through source water producing saturated air, cooling the saturated air producing potable water, and collecting the potable water. A method of removing contaminants from ambient air includes heating ambient air, bubbling the heated air through source water to produce
(Continued)

treated air and contaminant rich water, discharging the treated air, and discharging the contaminant rich water.

22 Claims, 8 Drawing Sheets

(51) Int. Cl.
  *B01D 5/00* (2006.01)
  *C02F 1/28* (2023.01)
  *C02F 1/32* (2023.01)
  *C02F 1/42* (2023.01)

(52) U.S. Cl.
  CPC .................. *C02F 1/32* (2013.01); *C02F 1/42* (2013.01); *B01D 2252/103* (2013.01); *B01D 2253/102* (2013.01); *C02F 2001/422* (2013.01); *C02F 2001/425* (2013.01); *C02F 2201/009* (2013.01)

(58) Field of Classification Search
  CPC .......... B01D 53/1475; B01D 2252/102; B01D 2252/103; C02F 1/10; C02F 1/32; C02F 1/42; C02F 1/44; C02F 1/283; C02F 9/00; C02F 2001/422; C02F 2001/425; C02F 2201/009
  See application file for complete search history.

(56) References Cited

U.S. PATENT DOCUMENTS

| | | |
|---|---|---|
| 2010/0212858 A1 | 8/2010 | Guth |
| 2010/0260653 A1 | 10/2010 | Jones |
| 2010/0314238 A1 | 12/2010 | Frolov et al. |
| 2011/0168227 A1* | 7/2011 | Carriere ................ F24S 10/503 126/647 |
| 2012/0111189 A1 | 5/2012 | Knudsen et al. |
| 2012/0160753 A1 | 6/2012 | Vora et al. |
| 2014/0166577 A1 | 6/2014 | Kanzaki et al. |
| 2015/0298051 A1 | 10/2015 | Kuopanportti et al. |
| 2016/0369674 A1 | 12/2016 | Younes et al. |
| 2017/0081211 A1* | 3/2017 | Becker ..................... B01D 3/16 |

FOREIGN PATENT DOCUMENTS

| | | |
|---|---|---|
| CN | 104495966 B | 4/2016 |
| CN | 105621509 A | 6/2016 |
| WO | 2018093885 A1 | 5/2018 |

OTHER PUBLICATIONS

International Preliminary Report on Patentability, corresponding PCT/US2017/061780, dated Apr. 26, 2019.
Extended European Search Report in European Patent Application No. 17872420.9 dated Jul. 15, 2020.

* cited by examiner

OPEN CIRCUIT SAT SYSTEM

CLOSED CIRCUIT SAT SYSTEM

SYSTEMS AND METHODS FOR GENERATING POTABLE WATER

CROSS-REFERENCE TO RELATED APPLICATIONS

This application is a U.S. national stage application and claims the benefit under 35 U.S.C. § 371 of PCT/US2017/061780, titled SYSTEMS AND METHODS FOR GENERATING POTABLE WATER, filed Nov. 15, 2017, which claims priority to U.S. Provisional Application No. 62/422,871, filed Nov. 16, 2016, which patent applications are hereby incorporated herein by reference in their entireties for all purposes.

FIELD OF THE TECHNOLOGY

Aspects and embodiments disclosed herein relate to systems and methods for generating water from a source water and ambient air. In particular, systems and methods involve saturating air with a source water, and then condensing water out of the air to produce a water condensate.

SUMMARY

In accordance with an aspect, there is provided a system for generating potable water from a source water. In some embodiments, the system comprises an enclosed vessel, a heating unit, an air distributor, a condenser, a collection vessel, and an exhaust air outlet. The enclosed vessel may be configured to receive source water. The heating unit may be configured to receive and heat ambient air. The heating unit may heat ambient air to produce heated air. The air distributor may be configured to receive the heated air and bubble the heated air through the source water to produce saturated air. In some embodiments, the air distributor is positioned within the enclosed vessel and is configured to bubble the heated air through source water in the enclosed vessel. The condenser may be configured to receive and cool the saturated air to produce a potable water condensate and a cooled air. In some embodiments, the condenser is fluidly connected downstream of the enclosed vessel. The collection vessel may be fluidly connected downstream of the condenser. The collection vessel may be configured to collect the potable water condensate. The exhaust air outlet may be fluidly connected downstream of the condenser.

In some embodiments, the system for generating potable water is electrically connected to a natural energy source. The natural energy source may be selected from the group consisting of a solar powered system, a wind powered system, a hydropower system, an ocean energy system, and a geothermal energy system.

In some embodiments, the system for generating potable water comprises a pump positioned upstream of the enclosed vessel and configured to pump ambient air to the air distributor. In some embodiments, the system for generating potable water comprises a recycle subsystem configured to deliver at least some of the cooled air to the air distributor. The recycle subsystem may extend between the condenser and the air distributor of the system. The recycle subsystem may further comprise a recycle heating unit configured to heat the cooled air. The recycle subsystem may further comprise a recycle pump configured to pump the recirculating air (for example, cooled air or recycled heated air) to the air distributor.

In some embodiments, the system for generating potable water may comprise a recycle subsystem extending between the condenser and the heating unit. The recycle subsystem may be configured to deliver at least some of the cooled air to the heating unit. Alternately, the recycle subsystem may extend between the condenser and the pump. The recycle subsystem may be configured to deliver at least some of the cooled air to the pump.

The condenser may be a geothermal cooling condenser. The condenser may be an ocean water thermal energy condenser. In some embodiments, the ocean water thermal energy condenser may be electrically connected to an electrical grid.

In some embodiments, the system for generating potable water comprises a pre-treatment subsystem configured to remove contaminants from the source water. The pre-treatment subsystem may be fluidly connected upstream of the enclosed vessel. The pre-treatment subsystem may comprise at least one of a source of a chlorine compound and one or more membrane filters.

In some embodiments, the system for generating potable water comprises a post-treatment subsystem configured to remove contaminants from the potable water condensate. The post-treatment subsystem may be fluidly connected to the collection vessel. The post-treatment subsystem may comprise one or more systems selected from the group consisting of a membrane filter system, a carbon filter system, and an ultraviolet decontaminant system.

The air distributor may be a fine bubble air distributor configured to provide fine bubbles substantially evenly throughout the source water.

In some embodiments, the system for generating potable water comprises an air diffuser. The air diffuser may be positioned upstream of the condenser. The air diffuser may be configured to reduce a velocity of the saturated air, for example, before the saturated air enters the condenser.

The system for generating potable water may comprise a catalytic mesh. The catalytic mesh may be positioned within the enclosed vessel. The catalytic mesh may be in fluid communication with the source water. In some embodiments, the catalytic mesh is configured to enhance $CO_2$ conversion from the ambient air in the source water.

In accordance with certain embodiments, the system for generating potable water may comprise first and second enclosed vessels arranged in series. The system may comprise first and second enclosed vessels configured to receive source water. The system may comprise a first air distributor positioned within the first enclosed vessel. The first air distributor may be configured to receive the heated air and bubble the heated t air through the source water in the first enclosed vessel to produce a first saturated air. The system may comprise a first condenser fluidly connected downstream of the first enclosed vessel. The first condenser may be configured to receive and cool the first saturated air to produce a first potable water condensate and a first cooled air. The system may further comprise a second air distributor positioned within the second enclosed vessel. The second air distributor may be configured to receive the first cooled air and bubble the first cooled air through the source water in the second enclosed vessel to produce a second saturated air. The system may comprise a second condenser fluidly connected downstream of the second enclosed vessel. The second condenser may be configured to receive and cool the second saturated air to produce a second potable water condensate and a second cooled air. The system may further comprise a first and second collection vessel configured to collect the first and second potable water, respectively.

In accordance with another aspect, there is provided a method for generating potable water from a source water. In some embodiments, the method comprises heating ambient air to produce heated air, bubbling heated air through source water to produce saturated air, cooling saturated air to produce a potable water condensate and cooled air, and collecting the potable water condensate.

In some embodiments, the method for generating potable water comprises recycling at least some of the cooled air. The at least some of the cooled air may be recycled by bubbling the cooled air through the source water. The method may further comprise heating the cooled air to produce a recycled heated air. The recycled heated air may be bubbled through the source water. The method may comprise pumping the cooled or recycled heated air.

Cooling the saturated air may comprise condensing the saturated air with a condenser, cooling the saturated air with a deep sea water cooling loop, or cooling the saturated air with a geothermal cooling loop.

In some embodiments, the method may comprise cooling the saturated air with an ocean water thermal energy condenser. The method for generating potable water may further comprise producing electrical energy with the ocean water thermal energy condenser. The method for generating potable water may further comprise providing the electrical energy to an electrical grid.

In some embodiments, the method for generating potable water comprises pre-treating the source water to remove contaminants. Pre-treating the source water may comprise filtering the source water with a membrane filter or disinfecting the source water by adding a chlorine compound to the source water.

In some embodiments, the method for generating potable water comprises post-treating the potable water condensate to remove contaminants. Post-treating the potable water condensate may comprise disinfecting the potable water condensate with ultraviolet light or filtering the potable water condensate with at least one of a membrane filter and a carbon filter. Post-treating the potable water condensate may comprise post-treating to meet a standard requirement for one or more of safe drinking water, laboratory deionized water, laboratory ultrapure water, and agricultural irrigation water.

The method for generating potable water may comprise reducing a velocity of the saturated air prior to cooling the saturated air.

In accordance with certain embodiments, the method for generating potable water may comprise bubbling the heated air through a first source water to produce a first saturated air. The method may further comprise cooling the first saturated air to produce a first potable water condensate and a first cooled air. The method may comprise bubbling the first cooled air through a second source water to produce a second saturated air. The method may further comprise cooling the second saturated air to produce a second potable water condensate and a second cooled air. The method may further comprise collecting the first and second potable water condensate.

In some embodiments, the method of generating potable water may comprise bubbling the heated air through source water comprising solids or precipitated solids. Bubbling the heated air may produce partially dried solids. The method may further comprise collecting the partially dried solids. In some embodiments, the partially dried solids comprise minerals. In some embodiments, the partially dried solids comprise wastewater concentrate.

In accordance with another aspect, there is provided a method of removing contaminants from ambient air. The method of removing contaminants from ambient air may comprise heating ambient air to produce heated air. The method of removing contaminants from ambient air may further comprise bubbling the heated air through source water to produce a treated air, and contaminant rich water. The method may further comprise discharging the treated air and discharging the contaminant rich water.

In some embodiments, the method of removing contaminants from ambient air may comprise discharging the used source water. The method may further comprise discharging a solid precipitate comprising contaminants.

In some embodiments, the method of removing contaminants may be employed to remove $CO_2$ from the ambient air. The method of removing contaminants from ambient air may comprise bubbling the heated air through source water to produce a treated air and $CO_2$ rich water. The method may further comprise discharging the treated air and discharging the $CO_2$ rich water. The method may further comprise discharging a solid precipitate comprising $CaCO_3$.

In some embodiments, the use of a catalytic mesh may be employed to enhance $CO_2$ conversion in the water and increase the $CO_2$ adsorption rate. For instance, the method of removing contaminants from ambient air may comprise enhancing $CO_2$ conversion in the source water by contacting the source water with a catalytic mesh.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Although water can be found everywhere, not all water is consumable. Liquid water on Earth can be found, for example, in oceans, lakes, ponds, rivers, aquifers and ice caps. The majority of liquid water on Earth contains dissolved contaminants and may require further processing for use. One common exemplary method of processing sea water may be sea water desalination and decontamination. Sea water desalination is generally accomplished by a distillation process, reverse osmosis, or electrodialysis. Even in coastal locations with a high availability of raw sea water for desalination, current methods of desalinating sea water may be cumbersome, expensive, and require a high amount of energy.

Another natural source of water may be atmospheric air. Earth's atmosphere may contain about 37.5 million billion gallons of water in the vapor phase. Water in the vapor phase is generally pure and may contain low concentrations of dissolved contaminants. Therefore, while atmospheric water may require extraction from the air, extracted water vapor may require a less intensive decontamination process than sea water. Further, extracting atmospheric water may be less energy intensive than some methods of desalinating sea water or purifying other sources of liquid water.

Unfortunately, efficiently harnessing water from the atmosphere to generate potable water has been challenged by low availability of water in the local atmosphere. The most common method of collecting atmospheric water may be passing ambient air through a condenser and removing the available quantities of water from the air. This method may be limited, at least because a significant portion of the livable land on Earth has an atmospheric relative humidity (RH) of as low as 20%. At such low RH levels, there may not be enough water in the surrounding atmosphere to capture a significant amount with a condenser.

Relative humidity is a measure of moisture content in air. The RH of an air-water mixture, expressed as a percentage, is generally defined as the ratio of the partial pressure of water vapor ($p_{H2O}$) to the equilibrium vapor pressure of water ($p^*_{H2O}$) over a flat surface of pure water at a given temperature. A RH of 100% means the air is fully saturated at the given temperature. Saturation may further be increased, for example, by increasing the temperature or decreasing the pressure.

Due to the low and variable RH of air for certain locations (in particular the locations that may struggle the most to obtain potable water), atmospheric water technologies have struggled to gain traction in the market. Further frustrating efforts of atmospheric water collection are the energy consumption needs of such a system. Since collection of water may be limited by the low RH, the required energy used to constantly run a condenser is only capable of generating a limited quantity of water.

Figure 3:
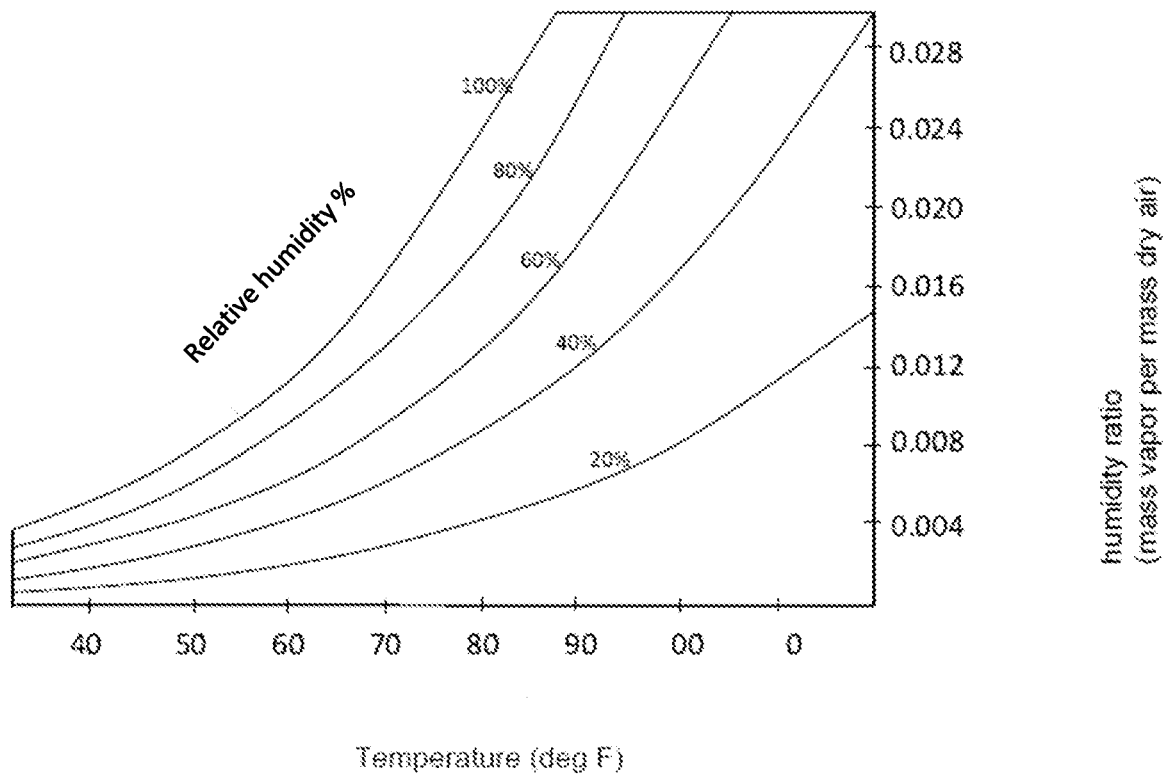
FIG. 3 is a graph of the mass of water in air (humidity ratio) for various relative humidity percentage values across a range of temperatures.

However, with a higher RH local atmosphere, more water may be generated without requiring much additional energy input. As shown in FIG. 3, water content at atmospheric saturation (100% RH) may be up to twice as much as at 50% RH. By increasing relative humidity of air, the rate of water generation may be multiplied. A system capable of increasing relative humidity may provide an increased yield of potable water, as compared to standard air to water technology. In addition, such a system may only require a limited additional amount of input energy to process ambient air.

Systems and methods disclosed herein for generating potable water may employ the use of readily available liquid water sources and ambient air to generate potable water. For example, systems and methods may increase RH in ambient air by bubbling the ambient air through source water to saturate the air. The saturated air may then be cooled to condense potable water out of the air.

The systems and methods may be compatible with up to 95% of the liquid water present on the surface of the earth. For example, the source water may be potable or non-potable water associated with sea water, naturally occurring fresh water, waste water, brackish water, and other sources of water. The water condensate generated by systems and methods disclosed herein can be collected and used for a variety of applications including potable water, industrial applications, municipal water plants, lab water, medical grade water, pharmaceutical grade water, semiconductor grade water, beverage and food preparation, controlled irrigation water, and agricultural applications.

As disclosed herein, "potable water" includes water of various purity grades that is suitable for a further use. For instance, potable water may be treated water, desalinated water, filtered water, purified water, distilled water, deionized water, demineralized, or high purity water. High purity water includes water with very low trace contaminants, specifically those measured in the low parts per billion (ppb) or parts per trillion (ppt) concentration range. The trace contaminants may include volatile organic carbon, inorganic ions, organic compounds, bacteria and other microbiological species, endotoxins and nucleases, particulates, and gases. Examples of high purity water include ultrapure water and water of grades 1-3 as established by the International Organization for Standardization (ISO) or types I-IV as established by ASTM International. In some specific non-limiting embodiments, ultrapure water has a resistivity of about 18.18 MΩ/cm at 25° C.

In some embodiments, the potable water has a resistivity between about 0.2 and about 18.2 MΩ/cm at 25° C., for instance, potable water may have a resistivity of about 0.2, about 0.25, about 1, about 5, about 10, about 15, about 18.18, or about 18.2 MΩ/cm at 25° C. The potable water may have a conductivity of between about 5 and about 0.056 μS/cm at 25° C. For instance, the potable water may have a conductivity of about 5 μS/cm, about 4 μS/cm, about 1 μS/cm, about 0.5 μS/cm, or about 0.056 μS/cm at 25° C. The potable water may have a total silica concentration of less than about 5 μg/L. For instance, the potable water may have a silica concentration of about 500 μg/L, about 300 μg/L, about 100 μg/L, about 10 μg/L, or about 3 μg/L or less. The potable water may have a total organic carbon (TOC) concentration of less than about 50 μg/L. For instance, the potable water may have a TOC concentration of about 200 μg/L, about 100 μg/L, or about 50 μg/L or less. The potable water may have a chloride concentration of less than about 50 μg/L. For instance, the potable water may have a chloride concentration of about 50 μg/L, about 30 μg/L, about 10 μg/L, about 5 μg/L, or about 1 μg/L or less. The potable water may have a sodium concentration of less than about 50 μg/L. For instance, the potable water may have a sodium concentration of less than about 5 μg/L, about 30 μg/L, about 10 μg/L, about 5 μg/L, or about 1 μg/L or less. The potable water may have a hardness of less than about 10 mg/L. For instance, the potable water may have a hardness of less than about 120 mg/L, less than about 100 mg/L, less than about 80 mg/L, less than about 60 mg/L, less than about 40 mg/L, less than about 20 mg/L, or less than about 10 mg/L. The potable water may have a total dissolved solids (TDS) concentration of less than about 50 mg/L. For instance, the potable water may have a TDS concentration of less than about 500 mg/L, less than about 400 mg/L, less than about 300 mg/L, less than about 200 mg/L, less than about 100 mg/L, less than about 50 mg/L, or less than about 10 mg/L.

The potable water may have any one or more of the qualities described above. The purity grade of the potable water generated by the systems and methods disclosed herein may be influenced by a pre-treatment of the source water and/or ambient air or by a post-treatment of the water condensate, as is discussed in more detail below.

In accordance with an aspect, there is provided a system for generating potable water from a source water. The system may generally be configured to elevate a humidity level of ambient air with the source water, for example to a saturation level, and then to harness potable water from the saturated air. In some embodiments, the system comprises an enclosed vessel, a heating unit, an air distributor, a condenser, a collection vessel, and an exhaust air outlet. The enclosed vessel may be configured to receive source water, the heating unit may be configured to receive and heat ambient air to produce heated air, the air distributor may be configured to receive the heated air and bubble it through the source water to produce a saturated air, and the condenser may be configured to cool and condense the saturated air to produce a potable water condensate and cooled air.

The enclosed vessel may be configured to receive source water from a water source. The enclosed vessel may be, for example, a receptacle, tank, reservoir, cistern, conduit, basin, or any other enclosed vessel configured to hold source water. The enclosed vessel may be a saturator, an evaporator, or any other apparatus configured to evaporate source water into heated air. In some embodiments, the enclosed vessel is an enhanced surface evaporator. The enclosed vessel may comprise at least one inlet and at least one outlet. For instance, the enclosed vessel may comprise an inlet configured to receive ambient air, heated air, or recycled air, an inlet configured to receive source water, an outlet configured to deliver saturated air, and an outlet configured to deliver contaminants, precipitated solids, or collected solids. Each of the inlet configured to receive air and the inlet configured to receive water may be separate distinct inlets or may be combined into one or more inlets. The contaminants, precipitated solids, or collected solids may be further processed for disposal or other use. In some embodiments, the enclosed vessel comprises a drain and a fill line, configured to provide automated operation or semi-automated operation for fill of the enclosed vessel with ambient air or source water. The enclosed vessel may comprise an overflow drain. The overflow drain may be configured to allow an overflow volume of source water to exit the enclosed vessel. The overflow drain may direct overflow water to a discard drain, direct overflow water to an overflow holding tank, or may recycle some or all of the source water back to the system feed.

The automated or semi-automated fill operation may be used in a continuous or batch process. In such embodiments, filling the enclosed vessel with source water may be regulated in order to provide adequate room for ambient air in the enclosed vessel, to limit liquid water from entering the condenser, or to maintain an adequate level of source water in the enclosed vessel.

In some embodiments, the enclosed vessel is dimensioned to maximize residence time of bubbles emerging from the air distributor positioned within the enclosed vessel and submerged in the source water. For instance, the enclosed vessel may be elongated in a vertical direction. The long residence time of bubbles may facilitate complete saturation of the heated air.

The system for generating potable water may comprise a product manifold configured to deliver potable water to a point of use. The product manifold may include a water delivery pump and an on/off toggle tap.

As disclosed herein, "source water" refers to a readily available water source that may contain contaminants or may be essentially free of contaminants. For example, source water may be potable water or non-potable water. Non-potable water is generally considered not fit for ingestion, i.e. drinking, or use in food preparation, without risk of health problems.

In some embodiments, the system for generating potable water comprises a pre-treatment subsystem configured to remove contaminants from the source water fluidly connected upstream of the enclosed vessel. The pre-treatment subsystem may be configured to remove contaminants from the source water, such that the concentration of contaminants is reduced, reducing contaminant interaction with the atmospheric air bubbled through the source water. For example, the pre-treatment subsystem may comprise a source of a chlorine compound or one or more membrane filters. The pre-treatment system may comprise one or more systems selected from the group consisting of a membrane filter system, a carbon filter system, an ion exchange system (including a cation exchange bed, an anion exchange bed, and/or a mixed bed), an ultraviolet decontaminant system, a biological water purification system, a microbial water filtration system, an ultrafiltration system, a cartridge filter system, a fibrous material filter system, and a reverse osmosis system.

In some embodiments, the pre-treatment subsystem is additionally or alternatively configured to remove contaminants from the atmospheric air. For instance, the pre-treatment subsystem may remove volatiles from the air. The pre-treatment subsystem may comprise one or more of an air filter, a thermodynamic sterilization system, an ultraviolet germicidal irradiation system, a carbon filter or activated carbon, polarized media, a photocatalytic oxidation system, an ionizer, immobilized cell technology, an ozone generator, and a titanium dioxide system. In some embodiments, the pre-treatment subsystem may be selected such that it does not remove a concentration of humidity from the atmospheric air as it enters the system.

Systems and methods disclosed herein may employ the use of chlorine compounds. In some embodiments, a chlorine compound may comprise one or more of chlorine ($Cl_2$), hypochlorite ($ClO^-$), a chloramine ($NH_2Cl$), a byproduct of chlorine, and a salt thereof. The chlorine compound may be, for example, liquid or solid sodium hypochlorite (NaOCl) (bleach). The one or more chlorine compounds may disinfect source water or potable water condensate by inactivating microorganisms. While chlorine or sodium hypochlorite may exhibit some disinfecting properties, chlorine byproducts that arise from the reaction between chlorine or sodium hypochlorite and water generally have strong disinfecting properties. Chlorine byproducts may include hypochlorous acid (HOCl), hypochlorite ions ($OCl^-$) hydrochloric acid (HCl), gaseous chlorine ($Cl_2$), and chlorine ions ($Cl^-$). Oxygen gas ($O_2$) and hydrogen ions ($H^+$) may also be produced.

Adding chlorine compounds to the source water or directly into the enclosed vessel may keep water in the enclosed vessel decontaminated. Furthermore, a fraction of the chlorine compounds may be volatized in saturated air and later condensed into product water condensate, keeping the product water condensate decontaminated as well. Systems and methods disclosed herein may distribute chlorine compounds to regulate contamination levels in all components of the system and/or in all process and product waters and gases. The source of a chlorine compound may be configured to deliver one or more chlorine compounds to source water or potable water condensate. In some embodiments, the source of a chlorine compound is fluidly connected to the enclosed vessel. The source of a chlorine compound may comprise one or more conduits or vessels to hold or deliver the chlorine compound. The source of a chlorine compound may comprise one or more pumps, blowers, fans, or the like, to promote addition of a chlorine compound.

Chlorine compounds may be introduced into one or more system components in solid, liquid, or vapor form. In some embodiments, the source of the chlorine compound may comprise a liquid chlorine compound dispenser. A liquid chlorine compound dispenser may be fluidly connected to the enclosed vessel and/or the potable water condensate collection vessel. In some embodiments, the source of the chlorine compound may comprise a chlorine tablet dispenser. A chlorine tablet dispenser may be connected to, for example, the enclosed vessel and/or the potable water condensate collection vessel. In some embodiments, the source of the chlorine compound may be a chlorine gas distributor. The chlorine gas distributor may be fluidly connected to any component of the system. For example, the chlorine gas distributor may be fluidly connected to the enclosed vessel. The chlorine dispenser or chlorine gas distributor may be automated or manually operated.

In some embodiments, addition of a chlorine compound may be accompanied by heating or cooling, as required. The system may comprise one or more heating or cooling elements to promote addition of a chlorine compound. For example, the enclosed vessel or a conduit of the system may comprise a heating or cooling element. The heating or cooling may facilitate chlorine compound dissolution in water, for example in source water or product condensate water. Dissolving chlorine in water may include dissolving solid chlorine (for example, a chlorine tablet) or dissolving chlorine gas in water. The heating or cooling may additionally or alternatively facilitate chlorine compound vaporization in process or product gases, for example in saturated air, cooled air, or recycled heated air. Heating or cooling may be performed according to the chlorine solubility graph shown in FIG. 9, whereby adjusting the temperature of one or more components in the system may dissolve or degas the chlorine compound. In some embodiments, for example, source water is cooled to a temperature shown in FIG. 9 to dissolve a predetermined amount of the chlorine compound in water.

Figure 10:
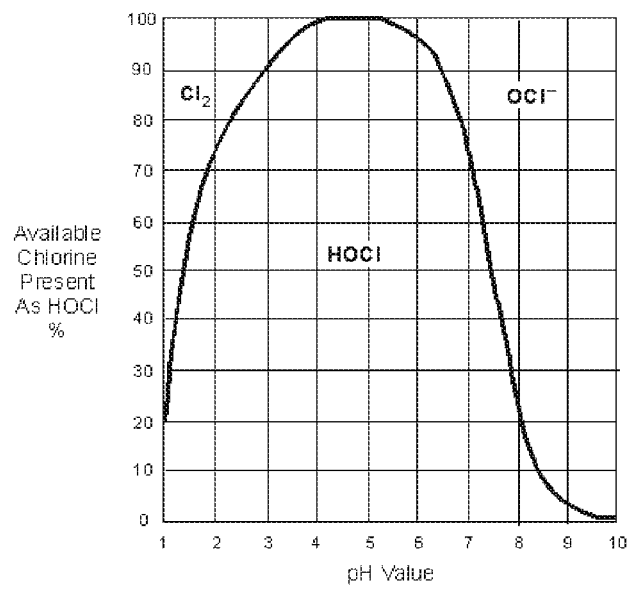
FIG. 10 is a graph of chlorine solubility as a function of water pH.

Adjusting a pH of the chlorinated water may alter a concentration or species of the chlorine in water. Specifically, chlorine may be present as $Cl_2$, HOCl or $OCl^-$ responsive to the pH of the water. In some embodiments, addition of a chlorine compound may be accompanied by a pH adjustment, as required. The pH adjustment may convert a chlorine compound, for example, $Cl_2$ gas, NaOCl, or $NH_2Cl$, to a chlorine byproduct, for example, HOCl or $OCl^-$ as shown in the graph of FIG. 10. In some embodiments, pH, for example, of the source water, is altered to a pH shown in FIG. 10 to produce one or more byproducts of a predetermined amount of the chlorine compound in water.

Systems and methods disclosed herein may employ the use of one or more membrane filters. The one or more membrane filters may be configured to retain particles or microorganisms larger than their pore size, for example, by surface capture. The one or more membrane filters may be configured to filter large macroparticles, such as trash and other solid waste contaminants. The one or more membrane filters may be configured to remove dissolved solids, volatile contaminants such as volatile organic compounds (VOCs), microorganisms, or smaller particles. For example, the one or more membrane filters may comprise a mesh filter, a nanofiltration system, a microfiltration system, an ultrafiltration system, a reverse osmosis system, or a fibrous material.

Systems and methods disclosed herein may employ the use of a carbon filter system. In some embodiments, a carbon filter system comprises a bed of activated carbon that is configured to remove contaminants and impurities in the potable water through adsorption. Carbon filter systems may remove chlorine, sediment, VOCs, taste and odor from water. The carbon filter system may be positioned within or upstream from the enclosed vessel. In some embodiments, the carbon filter system may be positioned upstream from the enclosed vessel, for example in a conduit fluidly connected to the enclosed vessel and comprising source water.

In at least some embodiments, VOCs may be addressed, for example, removed without filtration or other pre-treatment. The system start-up and activation of a condenser may be staggered to vaporize VOCs before condensing the saturated air. In some embodiments, ambient air may be pumped through source water comprising one or more VOCs for a period of time to vaporize VOCs. The VOCs may quickly vaporize and exit the system. After a few minutes of bubbling, the condenser may then be activated to produce potable water as described herein. In some embodiments, the ambient air may be pumped through the source water for at least about 20 minutes, about 15 minutes, about 12 minutes, about 10 minutes, about 8 minutes, about 6 minutes, about 5 minutes, about 2 minutes, or about 1 minute before activating a condenser. The amount of time ambient air may be pumped through the source water to vaporize VOCs may be selected according to the volume of source water in the enclosed vessel. According to some embodiments, source water may also be substantially decontaminated of VOCs by pumping ambient air through the source water. For instance, ambient air may be pumped through the source water to vaporize and release VOCs until the source water is substantially free of VOCs. In some embodiments, the VOC rich saturated air may be condensed instead of released to produce a VOC rich water condensate.

In some embodiments, the system for generating potable water may comprise an ion exchange system. Pre-treating source water or post-treating product water condensate may include treating with an ion exchange resin. As disclosed herein, an ion exchange resin may be a resin or a polymer that acts as a medium for ion exchange. In some embodiments, the ion exchange resin is comprised in an ion exchange column or ion exchange bed. The ion exchange resin may be a cation resin, an anion resin, or a mixed bed resin. The ion exchange resin may bind and remove contaminants from the source water or potable condensate water, for instance protons, hydroxides, single charged or double charged monatomic ions, polyatomic inorganic ions, organic bases and acids, and biomolecules such as amino acids, peptides, and proteins. The ion exchange resin may be positioned within the enclosed vessel or upstream from the enclosed vessel. In some embodiments, the ion exchange resin may be positioned within a conduit fluidly connected to the collection vessel.

Source water or potable water condensate may be decontaminated with an ultraviolet decontaminant system. A system for generating potable water may comprise an ultraviolet decontaminant system positioned within or upstream from the enclosed vessel. For instance, in some embodiments the ultraviolet decontaminant system is positioned within the enclosed vessel and configured to provide ultraviolet radiation to source water within the enclosed vessel. In some embodiments, the ultraviolet system may be positioned upstream from the enclosed vessel, for example in a conduit as an in-line ultraviolet reactor or in an ultraviolet reactor within or fluidly connected to the enclosed vessel. An ultraviolet decontaminant system may be configured to remove contaminants such as microorganisms or total organic carbon (TOC) compounds. The ultraviolet disinfection system may inactivate one or more species of microorganism to a desired log-inactivation percentage.

The system for generating potable water may include an ambient air inlet. The ambient air inlet may be positioned upstream of the air distributor. The ambient air inlet may be, for example, a conduit configured to receive and direct ambient air to the air distributor.

The system for generating potable water may further comprise a heating unit. In some embodiments, a heating unit may be configured to heat ambient air or recycled air. The heating unit may produce heated air. The heating unit may be positioned downstream of an ambient air inlet or upstream of the air distributor. For example, the heating unit may be configured to heat ambient air as it travels from the surrounding atmosphere to the air distributor. The heating unit may be configured to additionally heat cooled air that is recycled from the condenser, as described in more detail below. In some embodiments, the heating unit may be an in-line heating unit positioned within the ambient air conduit. In some embodiments, the heating unit is an electrically powered coil, a natural heating element, or a combination. For example, the natural heating element may be configured to harness and employ solar energy. In some embodiments, the natural heating element comprises an active solar heating system.

According to at least some embodiments, systems and methods disclosed herein may include increasing the ambient air's capacity to hold water vapor. In some embodiments, the ambient air may have an increased relative humidity. In some embodiments, the ambient air may be heated, pressurized, or continuously bubbled through source water. In some embodiments, the source water may be heated. The method for generating potable water may comprise introducing ambient air into an enclosed vessel and increasing the capacity of the ambient air to hold water vapor. The ambient air may be saturated, for example, at an increased capacity, and then potable water may be harnessed from the saturated air.

As disclosed herein, "saturated air" comprises water-saturated air or air saturated with a vaporized liquid. The saturated air may be fully saturated or supersaturated, but need not be. In some embodiments, the saturated air is more water-saturated than the ambient air. The saturated air may be ambient air having an increased relative humidity. For instance, the saturated air may be ambient air that has been bubbled through source water to become water-saturated.

As discussed throughout the specification, the relative humidity and/or temperature of any product air (for example, saturated air, heated air, cooled air, recycled heated air, or exhaust air) may be dependent on the relative humidity and/or temperature of the source water and/or surrounding ambient air. Furthermore, the temperature of any product water (for example, pre-treated water, condensed potable water, or post-treated water) may be dependent on the temperature of the source water and/or the surrounding ambient air.

In some embodiments, the saturated air has a relative humidity of between about 40% and about 60%, between about 60% and about 80%, between about 50% and about 100%, or between about 80% and about 100%. The saturated air may have a relative humidity of at least about 40%, at least about 50%, at least about 60%, at least about 70%, at least about 80%, or at least about 90%. The saturated air may have a relative humidity greater than about 90%, greater than about 95%, or greater than about 99%. The saturated air may be supersaturated, for example, having a relative humidity greater than 100%. In some embodiments, the saturated air may have a relative humidity that is at least 20% greater, at least 40% greater, at least 60% greater, or at least 80% greater than the relative humidity of the ambient air.

Systems and methods disclosed herein may include heating ambient air or recycled air. As shown in the graph of FIG. 3, warmer air is capable of carrying a greater amount of water vapor. The ambient air or recycled air may be heated to a temperature above the surrounding air temperature. For example, the ambient air or recycled air may be heated about 10° F., about 20° F., about 30° F., about 40° F., about 50° F., or about 60° F. In some embodiments, the ambient air or recycled air may be heated to a temperature of about 70° F., about 80° F., about 90° F., about 100° F., about 110° F., about 120° F., about 150° F., about 180° F., or about 210° F. In some embodiments, the ambient air or recycled air may be heated to a temperature of between about 115° F. and about 210° F. or between about 65° F. and about 115° F. The heating unit may be configured to heat the ambient air or recycled air to any temperature above the surrounding air temperature or above the temperature of the cooled air, as described in more detail below. For example, the heating unit may be configured to heat the air to at least about 70° F., at least about 80° F., at least about 90° F., at least about 100° F., at least about 110° F., at least about 120° F., at least about 150° F., at least about 180° F., at least about 210° F., between about 115° F. and about 210° F. or between about 65° F. and about 115° F. Furthermore, depending on the temperature of the source water, air that is bubbled through source water may emerge as saturated air at a slightly elevated temperature.

In some non-limiting embodiments, the source water may be heated upstream of the vessel and/or in the vessel. In some embodiments, the source water may be heated with an active solar water heating system. The source water may be heated with a heating unit, for example, comprising a heating coil. The source water may be heated such that the water in the vessel may reach an equilibrium temperature with the air.

In some embodiments, the system for generating potable water comprises a pump positioned upstream of the enclosed vessel and configured to pump ambient air or recycled air to the air distributor. The pump may comprise an air pump, a fan, or any other device capable of driving or pumping air to an air distributor. The pump may be positioned at an ambient air inlet, for example at an inlet of an ambient air conduit, an inlet of the enclosed vessel, or an inlet of the air distributor. In some embodiments, the pump is positioned upstream from a heating unit.

The system may comprise an air distributor configured to receive heated air and bubble the heated air through the source water to produce saturated air. In some embodiments, the air distributor is positioned within the enclosed vessel and is configured to bubble the heated air through source water in the enclosed vessel. For example, the air distributor may be substantially or completely submerged in source water. In some embodiments, the air distributor may be a fine bubble air distributor configured to provide fine bubbles. For instance, the distributor may be constructed and arranged to provide air bubbles having a minimized diameter and/or to provide air bubbles with a maximized total surface area. The air distributor may be a fine bubble diffuser or fine bubble aerator. In some embodiments, the air distributor is configured to provide bubbles substantially evenly throughout the source water. For example, the air distributor may be provided in a grid arrangement to facilitate even distribution of bubbles.

Systems and methods disclosed herein may employ even distribution bubbling or fine bubbling heated air through source water. During even distribution bubbling, the bubbles may be targeted to some or all areas of the source water. During fine bubbling, the air bubble size, as it releases into the liquid water, may be as small as possible maximizing air to water interaction. Generally, an increase in air to water interaction may provide a more efficient mass transfer of water into water vapor bubbles. Thus, the air distributor may be configured to saturate ambient air to a relative humidity as previously described herein.

According to some embodiments, systems and methods disclosed herein may be configured to promote or provide a relatively long residence time of distributed air bubbles. Increased residence time may improve saturation of the ambient air. An air distributor may be configured to produce air bubbles having a long residence time in the source water. Residence time may depend on, for example, air bubble size, concentration of air bubbles, air pressure of bubbles, volume of water, obstacles for rising bubbles, and height of the source water. Systems and methods disclosed herein may optimize one or more of these factors to provide an increased residence time of ambient air in the source water.

The system for generating potable water may comprise a condenser configured to receive and cool the saturated air. Cooling the saturated air may reduce the relative humidity or dehumidify the saturated air, producing product water condensate. The condenser may be configured to receive and cool the saturated air to produce a potable water condensate and cooled air. In some embodiments, the condenser is fluidly connected downstream of the enclosed vessel. For example, the condenser may be connected by a conduit configured to deliver saturated air from the enclosed vessel to the condenser. In some embodiments, the condenser is directly connected to the enclosed vessel, such that saturated air is received in the condenser from the enclosed vessel. The condenser may be fluidly connected to an exhaust air outlet positioned downstream from the condenser. The condenser may further be fluidly connected to a collection vessel. In some embodiments, the condenser is configured to cool the saturated air by at least 10° F. For example, the condenser may comprise a condenser coil at least 10° F. or 5° F. colder than the saturated air temperature.

In some embodiments, the system may comprise an air diffuser to reduce the velocity of saturated air before cooling or condensing the saturated air. The air diffuser may include a duct, nozzle, or other barrier. The air diffuser may be positioned upstream from the condenser. Accordingly, methods disclosed herein may comprise reducing a velocity of the saturated air after bubbling the ambient air to produce the saturated air and/or prior to cooling the saturated air. By reducing a velocity of the saturated air before cooling, the systems and methods may maximize residence time of saturated air through a cooling device or condenser. The maximized residence time may allow for more product water to be condensed from the saturated air.

Systems and methods disclosed herein may employ the use of a geothermal cooling condenser or a geothermal cooling loop. According to certain embodiments, a geothermal cooling loop may take advantage of the moderate temperatures in the ground to boost efficiency and reduce the operational costs of a cooling system. For instance, the system for generating potable water may comprise a geothermal cooling condenser, geothermal heat pump, or ground source heat pump. A geothermal cooling condenser may comprise a heat exchanger in contact with the ground or groundwater, configured to extract or dissipate heat from the system, producing cooled air and a potable water condensate.

According to certain embodiments, the geothermal cooling condenser may comprise a refrigerant closed loop configured to circulate refrigerant in direct thermal contact with the ground, or a refrigerant closed loop in thermal contact with an underground water and anti-freeze loop. The refrigerant closed loop may be in thermal contact with the saturated air, thus cooling the saturated air. The geothermal cooling loop may further comprise one or more liquid pumps. In some embodiments, the geothermal loop comprises one or more pumps configured to deliver the saturated air into the ground and deliver potable water condensate to the surface for further use. In some embodiments, the geothermal cooling condenser is configured to be in thermal communication with a subterranean ground level, for example, at least 6 meters below the surface of the ground.

The system for generating potable water may comprise an ocean water thermal energy condenser. In some embodiments, the saturated air may be cooled, condensed, or dehumidified with an ocean water thermal energy condenser. Generally, an ocean water thermal energy condenser may employ the temperature difference between cooler deep water and warmer shallow or surface sea water to run a heat engine. The cooler deep water may be configured to be in thermal contact with the saturated air. For instance, cooler water may be pumped to the surface from deeper levels of the ocean to cool the saturated air at the surface. According to some embodiments, the ocean water thermal energy condenser may comprise a closed loop configured to circulate a eutectic system or refrigerant and/or water. In some embodiments, the closed loop configuration comprises more than one loop for circulating the eutectic system or refrigerant and/or water between the deep ocean and the surface.

According to certain embodiments, the cooler deep water eutectic system, or refrigerant is pumped from the deeper ocean level to the surface through an insulated conduit, such that the temperature of the cooler water being pumped experiences minimal to no changes as it is driven through the conduit (for example, heat transfer through the conduit is minimized). The fluid temperature may increase by about less than 10° F., 5° F., or 1° F., as it is pumped to the surface. In some embodiments, the change in temperature of the cooler water, eutectic system, or refrigerant through an insulated conduit is negligible.

In some embodiments, the saturated air may be pumped to a subaqueous level to be condensed, and the potable water condensate may be pumped to the surface, thus reducing pumping volumes and conserving energy. The saturated air may be pumped through a high heat transfer conduit, such that heat is transferred from the saturated air and/or potable water condensate to the ocean (for example, heat transfer through the conduit is maximized). The potable water condensate may be at its coolest temperature at the lowest point in the loop. In some embodiments, the cooler deep water is at least 100 meters below the surface of the ocean, the closed loop may circulate between the surface of the ocean and at least 100 meters below the surface of the ocean, or the saturated air is pumped at least 100 meters below the surface of the ocean. For example, the cooler deep water may be at least 300 meters below the surface of the water, the closed loop may circulate between the surface of the ocean and at least 300 meters below the water or the saturated air may be pumped at least 300 meters below the surface of the ocean.

Thus, systems and methods disclosed herein may comprise cooling or condensing saturated air by pumping it to a subaqueous level through a high heat transfer conduit. Systems and methods may further comprise pumping condensed water from a subaqueous level to an ocean surface level through a low heat transfer conduit.

Ocean water thermal energy heat engines are generally designed and employed to produce useful work, for example electricity. According to certain embodiments, an ocean water thermal energy heat engine or condenser may be in electrical communication with the system to generate potable water and/or in thermal communication with the condenser to cool the saturated air. Water moving or exiting the heat engine or condenser may generate electricity, for example by rotating a turbine to generate electricity, or the water may be in thermal contact with a second closed loop comprising a refrigerant fluid or gas. The thermal contact may vaporize the refrigerant fluid or expand the gas to rotate a turbine and generate energy. Cool water or air may be in thermal communication with the second closed loop expanded gas to complete the thermal energy cycle. Ocean water heat engines or condensers may provide cooled water or air as a by-product of electricity production. In some embodiments, systems and methods disclosed herein comprise an ocean water thermal energy heat engine or condenser electrically connected to an electrical grid.

In some embodiments, systems or methods disclosed herein may generate useful energy, for example, in the form of electricity for consumption within the system. For instance, electricity generated by an ocean water heat engine or ocean water thermal energy condenser may be employed to run some or all components of the system (for example, pumps, heating units, cooling units, condensers, etc.). Additionally, or alternatively, systems or methods disclosed herein may generate energy or electricity for an electrical grid. The system for producing potable water may be electrically connected to an electrical grid and configured to produce electrical energy and provide the electrical energy to an electrical grid.

Systems and methods disclosed herein may employ the use of a Peltier thermoelectric condenser to condense potable water condensate from the saturated air. The Peltier thermoelectric condenser may include a refrigerant fluid comprised within a coil, configured to cool the saturated air. In certain embodiments, the polarity on the Peltier thermoelectric condenser may be reversed to heat the condenser. The reversal of polarity on the Peltier thermoelectric condenser may be employed to heat the fluid in the condenser coil to evaporate water film present on the coil and inhibit or reduce mold or biofilm on the coil. The reversal of polarity may be performed periodically for maintenance or as-needed.

In some embodiments, the system may comprise a heated air bypass, configured to deliver heated air to the condenser, for example, to dry any remaining water film on the condenser. The system may comprise a cooled air bypass configured to deliver cooled air back to the condenser. For instance, the cooled air bypass may provide cooler air to blow over the condenser and act as a heat sync for any heated condenser fluid. The heated air bypass or cooled air bypass may inhibit or reduce the formation of mold or biofilm growth on the condenser when the system is idle. Thus, heated air or cooled air may be driven through the condenser periodically for maintenance, or on an as-needed basis. In some embodiments, the heated air bypass or cooled air bypass comprises a pump or fan to pump air through the bypass.

According to some embodiments, the system comprises a pump or fan positioned downstream from the condenser, and configured to pump cooled air from the condenser through the exhaust air outlet. The cooled air may be discharged from the system, for example as exhaust, or returned to an earlier component of the system through a recycle subsystem.

Systems and methods disclosed herein may cool saturated air to produce a potable water condensate. In some embodiments, the saturated air is saturated to substantially between about the relative humidity of the surrounding ambient air and about 100% RH. Cooling saturated air may condense water vapor contained in the saturated air, producing cooled air and a liquid water condensate which may be collected and used as potable water.

As disclosed herein, "cooled air" comprises saturated air exiting the condenser. As shown in the graph of FIG. 3, decreasing temperature may decrease the humidity ratio (mass vapor per mass dry air) of the saturated air. The cooled air may have substantially the same RH % as the saturated air or may have a slightly lower RH % than the saturated air. The decrease in humidity ratio may produce liquid water condensate as the saturated air temperature drops within the condenser. The cooled air may have a temperature of about 210° F., 180° F., 150° F., 120° F., 100° F., 90° F., 80° F., 70° F., 60° F., 50° F., or 40° F., or between about 210° F. and about 40° F., between about 80° F. and about 40° F., between about 80° F. and about 60° F., between about 80° F. and about 70° F., or between about 75° F. and about 65° F. For example, the cooled air may have a temperature about 10° F. less than the temperature of the saturated air. The cooled air may have a temperature of about 10° F., about 20° F., about 30° F., about 40° F., or about 50° F. less than the temperature of the saturated air or less than the temperature of the surrounding ambient air.

In some embodiments, potable water condensate is collected in a collection vessel. The collection vessel may be configured to collect the potable water condensate. The collection vessel may be positioned below the condenser, such that potable water condensate extracted from the saturated air is delivered to the collection vessel by gravity. Alternately, potable water condensate may be delivered to the collection vessel by one or more pumps. The collection vessel may comprise one or more tanks, conduits, receptacles, reservoirs, cisterns, basins, or other vessels configured to hold potable water. In some embodiments, the collection vessel is a conduit configured to deliver potable water condensate to a point of use. The potable water condensate may be post-treated for further use or to remove contaminants.

In some embodiments, the system for generating potable water comprises a post-treatment subsystem configured to process the potable water for further use. The post-treatment subsystem may be fluidly connected to the collection vessel. For instance, the post-treatment subsystem may be positioned within or downstream from the collection vessel. The post-treatment subsystem may be configured to remove contaminants from the potable water condensate. In some embodiments, the post-treatment subsystem may comprise one or more systems selected from the group consisting of a membrane filter system, a carbon filter system, an ion exchange system (including a cation exchange bed, an anion exchange bed, and/or a mixed bed), an ultraviolet decontaminant system, and an ultrafiltration system. The post-treatment subsystem may comprise a source of one or more chlorine compounds.

The post-treatment subsystem may be configured to process the potable water to meet a standard requirement for the desired application of the water. For instance, the post-treatment subsystem may be selected and configured to produce potable water meeting the standards for drinking water (for example, less than 1.5 mg/l of fluoride, less than 10 µg/l of lead, less than 1µg/l of mercury, less than 10 µg/l of tetrachloroethene and trichloroethene, less than 0.1 µg/l polycyclic aromatic hydrocarbons, or any other parameter meeting the Safe Drinking Water Act). The post-treatment subsystem may be selected and configured to produce potable water meeting the standards for laboratory deionized water (for example, having a resistivity of at least 10 MΩ·cm and a conductivity of at least 0.1 µS/cm at 25° C., or any other parameter meeting the guidelines set forth by American Society for Testing and Materials or the International Organization for Standardization). The post-treated subsystem may be selected and configured to produce potable water meeting the standards for laboratory ultrapure water (for example, less than 1µg/l total organic carbon, less than 200 particles/l, less than 0.1 µg/l non-volatile residue, less than 0.5 µg/l silica, less than 0.01 µg/l of other elements, less than 0.05 µg/l of ionic compounds, less than 1 CFU/100 ml of microbiological particles, or any other parameter meeting the guidelines set forth by the United States Pharmacopeia or the Semiconductor Equipment and Materials International standards). The post-treatment subsystem may be selected and configured to produce potable water meeting the standards for agricultural irrigation (for example, 0.5 mg/l to 5 mg/l of chlorine, 10-30 mg/l of nitrogen, 0.1-30 mg/l of phosphorus, less than 450 mg/l of total dissolved solids, or any parameter specifically selected for the desired terrain and crop). In some embodiments, the post-treatment may include dosing the potable water with one or more compounds required to meet the standards for agricultural irrigation water.

In some embodiments, one or more chlorine compounds may be directly added to a collection vessel containing product water condensate. For instance, a source of a chlorine compound may be configured to deliver one or more chlorine compounds to the potable water condensate. The source of a chlorine compound may be fluidly connected to the collection vessel, as previously described.

Systems and methods disclosed herein may employ dechlorination techniques to remove some or all of the chlorine compounds that are added. In some embodiments, post-treated water may comprise 4 ppm or less dissolved chlorine at room temperature. Water that comprises greater than 4 ppm of dissolved chloride may be discarded. Dechlorination may be employed as a post-treatment of the potable water condensate or the cooled air. Dechlorination can be employed throughout the system or in one or more system components. In some embodiments, the system for producing potable water may comprise a dechlorination subsystem. The dechlorination subsystem may comprise a carbon filter system. Dechlorination may be achieved by adsorption of the chlorine compounds to a carbon filter system. The dechlorination subsystem may comprise a source of sulfur dioxide. Dechlorination may be achieved by adding one or more of sulfur dioxide, sodium sulfite, sodium bisulfite, sodium metabisulfite, or a salt of a sulfur dioxide.

Figure 9:
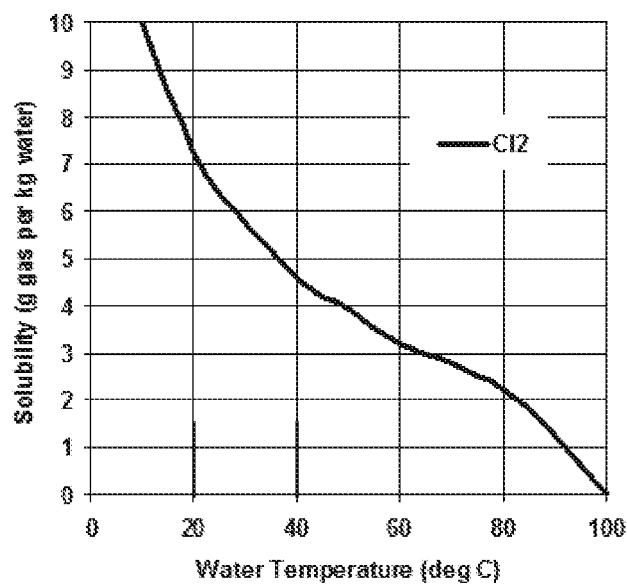
FIG. 9 is a graph of chlorine solubility as a function of water temperature.

Dechlorination may additionally or alternatively be accomplished by a thermal dechlorination. The system may comprise one or more heating or cooling elements to promote removal of a chlorine compound. For example, the potable water condensate collection vessel or a conduit of the system may comprise a heating or cooling element. As shown in the graph of FIG. 9, by elevating the temperature of water, the water may be degassed to remove chlorine compounds. Heating or cooling may be performed according to the chlorine solubility graph shown in FIG. 9, whereby adjusting the temperature of one or more components in the system may dissolve or degas the chlorine compound. In some embodiments, for example, source water is heated to a temperature shown in FIG. 9 to degas a predetermined amount of the chlorine compound in from the water. The system may comprise one or more pumps, fans, blowers, or the like to pump chlorinated air throughout the system and/or out of the exhaust outlet.

Systems and methods disclosed herein may employ the use of a membrane filter system. A membrane filter system may comprise one or more membrane filters, as previously discussed herein. The membrane filter system may be positioned downstream from the collection vessel. For example, the membrane filter system may be positioned within a conduit downstream from the collection vessel and be configured to further process the potable water condensate.

The post-treatment system may comprise a carbon filter system, as previously discussed herein. The carbon filter system may be positioned within or downstream from a collection vessel. For example, a carbon filter system may be positioned in a conduit fluidly connected downstream from a collection vessel.

The ion exchange resin may be disposed in an ion exchange column or ion exchange bed positioned within or downstream from the collection vessel. In some embodiments, one or more ion exchange columns or beds are positioned within a conduit fluidly connected to the collection vessel.

In some embodiments, the system for generating potable water may comprise an ultraviolet decontaminant system positioned within or downstream from the collection vessel. The ultraviolet decontaminant system may be configured to provide ultraviolet radiation to potable water condensate within the collection vessel. In some embodiments, the ultraviolet system may be positioned downstream from the collection vessel, for example in a conduit as an in-line ultraviolet reactor or in within the collection vessel in an ultraviolet reactor. Saturated air may exit the condenser at a lower temperature and lower relative humidity.

In some embodiments, the system for generating potable water comprises an exhaust air outlet. The exhaust air outlet may be fluidly connected downstream of the condenser. The exhaust air outlet may be a conduit or opening configured to allow passage of cooled air. The cooled air may become exhaust air upon exiting the system, for example, through the exhaust air outlet. The cooled air diffuses into the surrounding ambient air once exiting the system as exhaust. Thus, exhaust air may have an atmospheric relative humidity or temperature.

According to some embodiments, the system further comprises a recycle subsystem. The recycle subsystem may be positioned to extend between the condenser and the air distributor. The recycle subsystem may be configured to deliver at least some of the cooled air back to the enclosed vessel, for example, through the air distributor. In some embodiments, the system may comprise a recycle subsystem positioned to extend between the condenser and the heating unit. Such a recycle subsystem may be configured to deliver at least some of the cooled air to the heating unit. Alternatively or additionally, the system may comprise a recycle subsystem positioned to extend between the condenser and the pump. The recycle subsystem may be configured to deliver at least some of the cooled air to the pump.

Cooled air may be recycled through a recycle subsystem. The recycle subsystem may comprise one or more conduits or pumps. In some embodiments, the recycle subsystem comprises a conduit providing fluid connection between the condenser and the air distributor. In some embodiments, the recycle subsystem comprises one or more pumps or fans within the conduit or downstream from the condenser. In some embodiments, the recycle subsystem comprises a conduit in fluid connection with a pump fluidly connected with the ambient air inlet. In some embodiments the recycle subsystem comprises a recycle heating unit or is fluidly connected to a heating unit. The recycle subsystem may be configured to facilitate thermal contact between the cooled air and heated elements of the system, for example by passing the cooled air near hot liquid in the condenser coil or a radiator.

Systems and methods disclosed herein may employ the use of a radiator for cooling and/or heating air or water. The radiator may be positioned on a hot return coil of the condenser. In some embodiments, the radiator may be configured to transfer heat from a hot return coil of the condenser to the ambient air or the cooled air being recycled back to the enclosed vessel. The radiator may serve as a recycle heating unit to produce recycled heated air.

Systems and methods disclosed herein may employ the use of a heat pump to transfer heat energy within the system. The heat pump may be positioned on a hot return coil of the condenser. In some embodiments, the heat pump is configured to transfer heat energy to ambient air and/or cooled air as it is being recycled. The heat pump may further be employed to provide electricity to one or more component of the system.

In accordance with some embodiments, systems for generating potable water may be employed in series. The system for generating potable water may further comprise a second enclosed vessel. The cooled air exiting the condenser may be bubbled through source water in the second enclosed vessel to once again become saturated air. For example, the second enclosed vessel may comprise holes for air to be propelled or pumped into the second enclosed vessel for bubbling through the source water. According to certain embodiments, the second enclosed vessel contains a thin layer of source water, which may be a smaller volume of source water than is contained in the first enclosed vessel.

The newly saturated air bubbled through the second enclosed vessel may be condensed with a second condenser to become newly cooled air before being discharged or recycled. In some embodiments, the cooled air is heated before being bubbled through the second enclosed vessel. In some embodiments, the system employed in series comprises one or more pumps or fans configured to deliver the cooled air to the second enclosed vessel. In some embodiments, the system comprises more than one or more than two systems employed in series, as described herein.

In some embodiments, systems and methods disclosed herein may be electrically connected to an energy source. For example, the energy source may be an electric source, an oil powered source, a gas powered source, a coal powered source, or a natural energy source.

Systems and methods disclosed herein may employ the use of one or more natural energy sources. For instance, in some embodiments, the system for generating potable water is electrically connected to a natural energy source. The natural energy source may be selected from the group consisting of a solar powered system, a wind powered system, a hydropower system, an ocean energy system, an ocean temperature driven turbine, a deep ocean water powered condenser, a wave energy system, and a geothermal energy system. The one or more natural energy source may be an ocean temperature driven turbine or a deep ocean water powered condenser, such as the ocean water thermal energy heat engine or condenser disclosed herein. The one or more natural energy source may be configured to power at least one of a pre-treatment system, a heating unit, an air pump, an air distributor, a condenser, a post-treatment system, or a water pump.

In accordance with another aspect, there is provided a method for generating potable water from a source water. In some embodiments, the method comprises bubbling ambient air through source water to produce saturated air, cooling saturated air to produce a potable water condensate and cooled air, and collecting the potable water condensate. In some embodiments, the method comprises employing at least one natural energy source.

In some embodiments, the method for generating potable water comprises heating ambient air or recycled air, as previously discussed herein. The method may comprise heating ambient air or recycled air to produce heated air. For example, the method may comprise heating the ambient air or recycled air with at least one heating unit. The method may comprise bubbling the heated air through source water.

Methods disclosed herein may comprise pumping ambient air or recycled air, for example before bubbling the ambient air through source water. Pumping the ambient air or recycled air may comprise pumping or fanning the air with an air pump, a fan, or any other device capable of pumping air. In some embodiments, the ambient air or recycled air is pumped to deliver the air to the source water. For example, the air may be pumped from the surrounding atmosphere to an air distributor configured to distribute the air through the source water.

The method for generating potable water may comprise introducing source water into an enclosed vessel, as previously discussed herein. In some embodiments, the method for generating potable water comprises removing contaminants, precipitates, or collected solids from the enclosed vessel. For example, contaminants, precipitated solids, or collected solids may be removed from source water.

In some embodiments, the method for generating potable water comprises pre-treating the source water to remove contaminants. A specific pre-treatment for the source water may be selected based on the specific source or contents of the source water. For instance, source water comprising solid particles may be filtered prior to bubbling ambient air through the source water.

Pre-treating the source water may comprise filtering the source water with a membrane filter or disinfecting the source water by adding a chlorine compound to the source water. Pre-treating the source water may comprise disinfecting the source water with ultraviolet light, filtering the source water with a carbon filter, or filtering the source water with an ion exchange resin.

The method for generating potable water may comprise bubbling ambient air through source water to produce saturated air. In some embodiments, the ambient air is heated to produce heated air. Heating the ambient air may increase its capacity to hold water vapor. Bubbling heated air through source water may increase the relative humidity of the heated air or increase the mass of water vapor in the heated air.

In some embodiments, bubbling heated air comprises producing fine bubbles of the heated air to distribute through the source water. Heated air may be bubbled through the source water to produce saturated air. Bubbling the heated air though source water may comprise increasing the relative humidity of the heated air or increasing the mass of water vapor in the heated air, for example to increase saturation, reach a fully saturated state of the air, or reach a supersaturated state of the air. Fine bubbles may maximize the surface area of the air in the source water, and thus the air to water interaction between the heated air bubbles and the source water. Bubbling heated air may comprise providing targeting bubbles to some or all areas of the source water. For example, the method may comprise bubbling the heated air with an air distributor. The method may comprise bubbling the heated air with a fine bubble air distributor.

Methods disclosed herein may comprise cooling the saturated air. The saturated air may be cooled to produce cooled air and a potable water condensate. In some embodiments, cooling the saturated air comprises condensing the saturated air or dehumidifying the saturated air. Cooling the saturated air may comprise condensing the saturated air with a condenser, cooling the saturated air with a deep sea water cooling loop, or cooling the saturated air with a geothermal cooling loop, as previously discussed herein.

In some embodiments, the method for generating potable water comprises recycling at least some of the cooled air. The at least some of the cooled air may be recycled by bubbling the cooled air through the source water. In some embodiments, recycling at least some of the cooled air may comprise pumping or heating the at least some cooled air, for example, to produce recycled heated air. Recycling at least some of the cooled air may comprise delivering the at least some cooled air to the source water, or delivering the at least some cooled air to an air distributor configured to bubble the at least some cooled air through the source water.

In some embodiments, recycling at least some of the cooled air may comprise heating the at least some cooled air and delivering the recycled heated air to the source water or to an air distributor configured to bubble the recycled heated air through the source water. The recycled heated air may have a lower RH % than the cooled air. As shown in the graph of FIG. 3, increasing temperature of the cooled air may lower the RH % and increase the air's capacity to accept a greater mass of vapor.

In some embodiments, the recycled heated air has a RH between about 70% and about 100%, between about 80% and about 95%, or between about 85% and about 90%. The recycled heated air may have a RH of less than about 100%, less than about 95%, less than about 90%, less than about 85%, less than about 80%, less than about 75%, or less than about 70%. In some embodiments, the RH of the cooled air is decreased by at least about 5%, at least about 10%, at least about 15%, or at least about 20% when reheating. The recycled heated air may have a temperature of between about 75° F. and about 100° F., between about 80° F. and about 95° F., or between about 85° F. and about 90° F. The cooled air may be heated by at least about 5° F., at least about 10° F., at least about 15° F., at least about 20° F., or at least about 25° F. upon reheating.

At least some cooled air may be discharged as exhaust air and processed for further use. For example, the exhaust air may be collected. The exhaust air may be filtered or further humidified or dehumidified. In some embodiments, the exhaust air is used for cooling a space or an environment.

The method for generating potable water may comprise collecting the potable water condensate. In some embodiments, the potable water condensate may be collected in a collection vessel, as previously described. The collected potable water condensate may be treated, stored, or delivered for further use.

In some embodiments, the method for generating potable water comprises post-treating the potable water condensate to remove contaminants. Post-treating the potable water condensate may comprise treating the potable water condensate for further use. In some instances, the specific post-treatment is selected based on the desired further use of the potable water condensate. In some embodiments, the potable water condensate is further used for applications including potable water, industrial applications, municipal water plants, lab water, beverage and food preparation, controlled irrigation water, and agricultural applications.

Post-treating the potable water condensate may comprise disinfecting the potable water condensate with ultraviolet light or filtering the potable water condensate with at least one of a membrane filter, a carbon filter, and an ion exchange resin. In some embodiments, post-treating the potable water condensate may comprise disinfecting the potable water condensate by adding one or more chlorine compounds.

Disinfecting source water or potable water with ultraviolet light may comprise exposing the source water or potable water condensate to ultraviolet radiation, as previously discussed.

Figure 1:
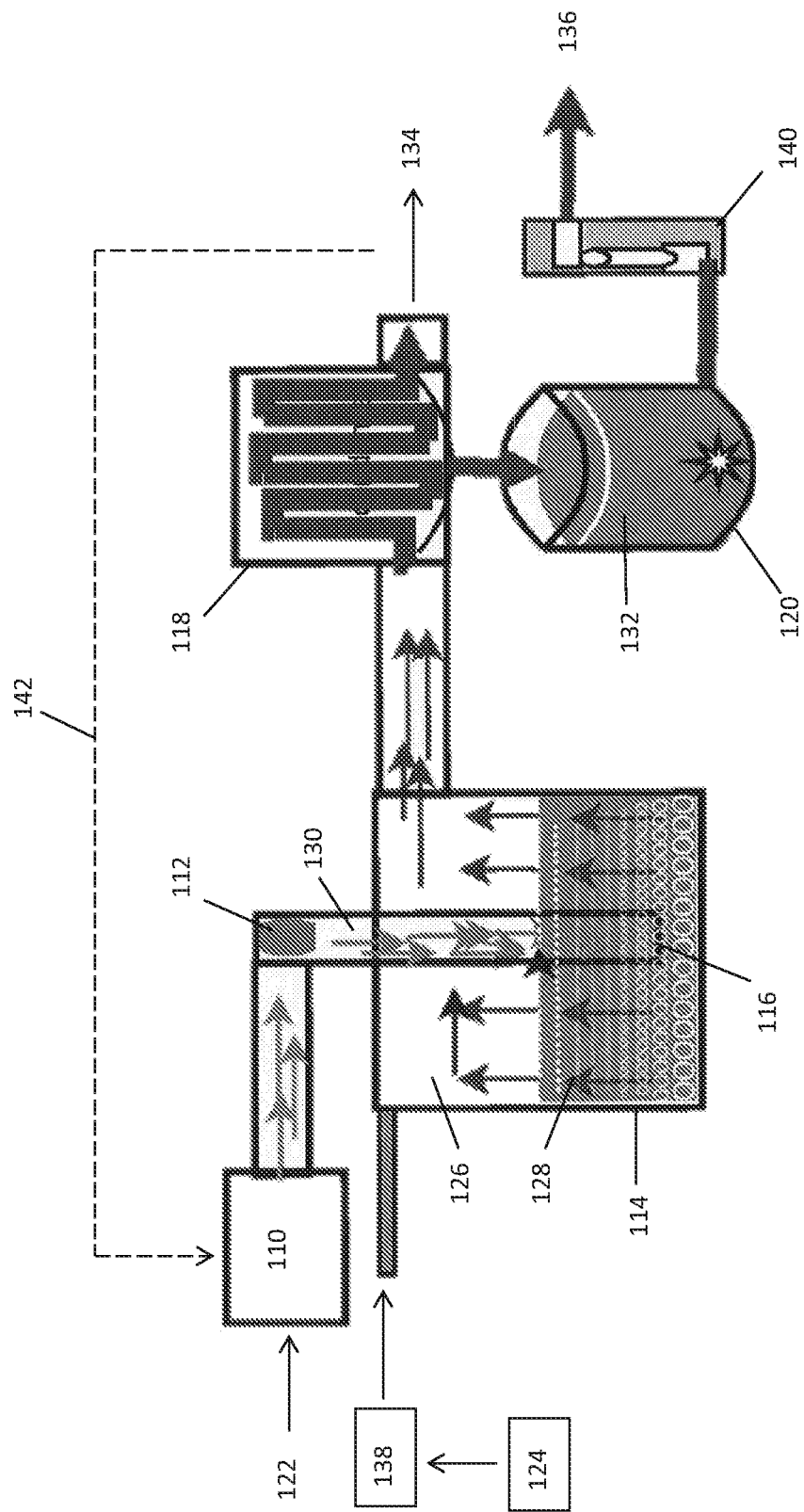
FIG. 1 is a schematic drawing of a system for generating potable water from a source water, in accordance with one or more embodiments.

With particular reference to FIG. 1, a system for generating potable water from a source water may comprise an enclosed vessel 114, a heating unit 112, an air distributor 116, a condenser 118, a collection vessel 120, and an exhaust air outlet 134. In the exemplary system of FIG. 1, the system may further comprise a pump 110 configured to pump ambient air 122 into the enclosed vessel 114, a recycle subsystem 142 configured to deliver at least some of the cooled air to the air distributor 116, for example by pumping with a pump 110, a pre-treatment subsystem 138 configured to pre-treat water from the source of the source water 124, and a post-treatment subsystem 140 configured to post-treat potable water condensate 132 and produce post-treated potable water 136. In some embodiments, the system may be configured to heat ambient air 130, bubble the heated air 130 through source water 128, and produce saturated air 126.

Figure 2:
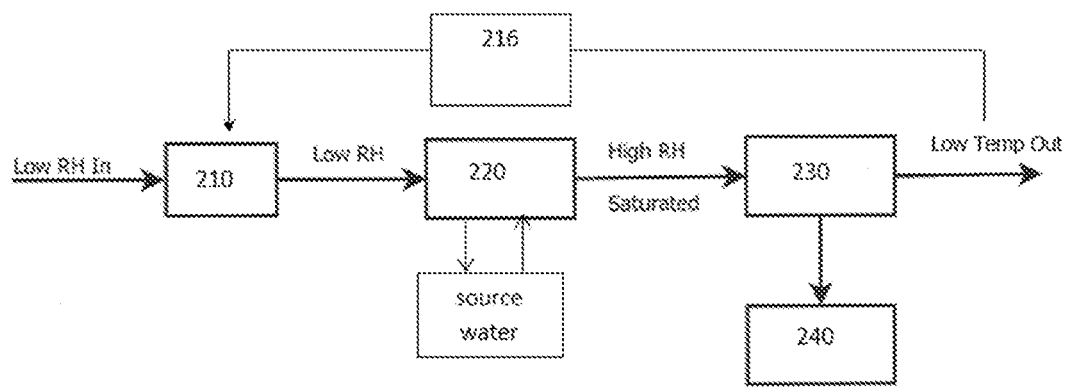
FIG. 2 is a box diagram of a method for generating potable water from a source water, in accordance with one or more embodiments.

A box diagram of one example of a method for generating potable water from a source water is shown in FIG. 2. With particular reference to FIG. 2, a method for generating potable water from a source water may comprise heating ambient air 210, bubbling heated air through source water 220 to produce saturated air, cooling saturated air 230 to produce a potable water condensate and cooled air, and collecting the potable water condensate 240. In some embodiments, the method of producing potable water may further comprise pumping and/or heating ambient air 210 and recycling at least some of the cooled air 216. In accordance with the specific exemplary method of FIG. 2, low relative humidity air may be pumped and may be heated, the heated low relative humidity air may be bubbled through source water to produce saturated air having an increased relative humidity, and the high relative humidity saturated air may be condensed to produce a low temperature air and a potable water condensate. The low temperature air may be recycled, including, for example, pumping and heating, lowering the relative humidity. The recycled low relative humidity air may be again bubbled through source water, and so on.

Figure 4:
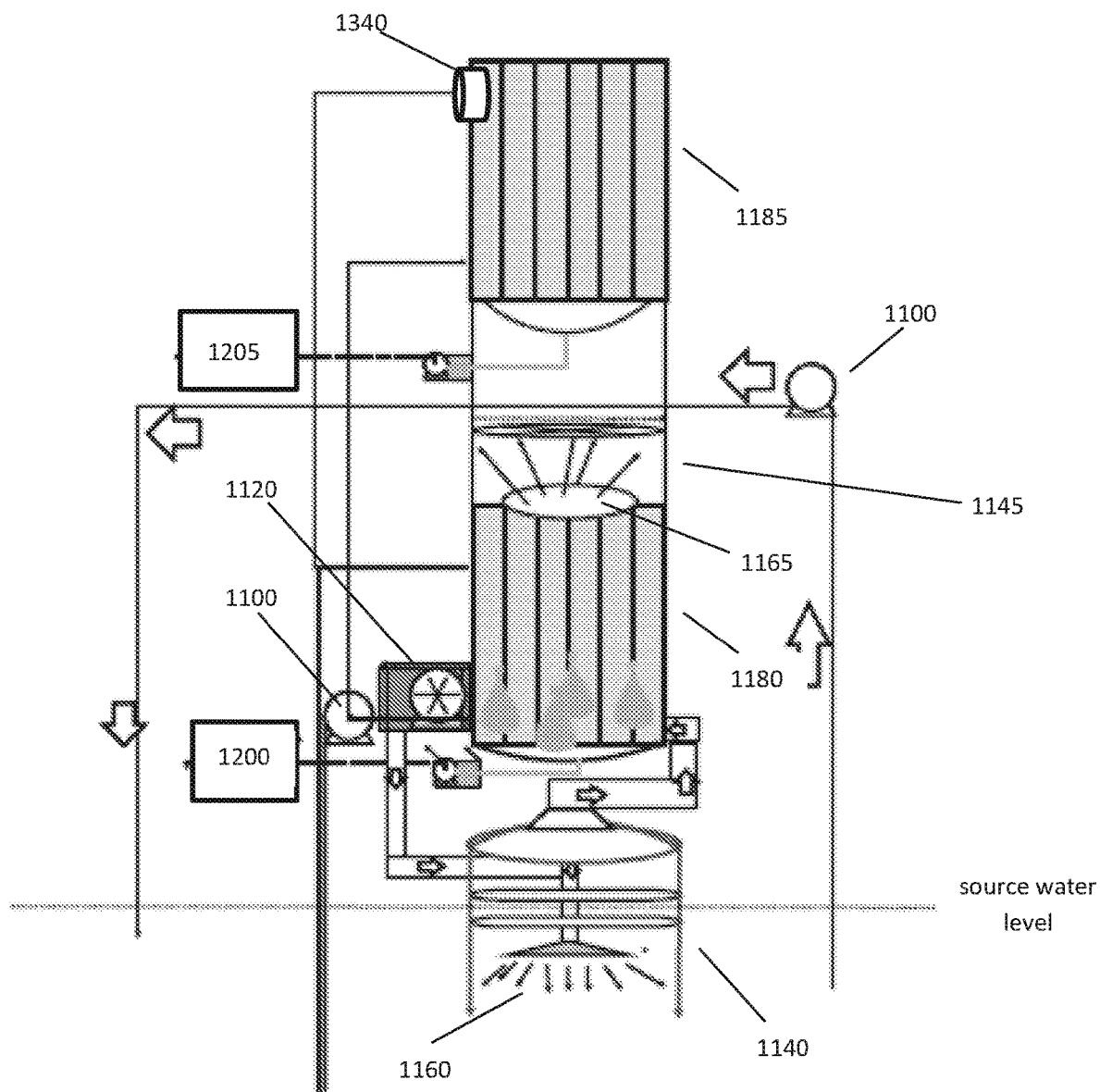
FIG. 4 is a schematic drawing of an alternate system for generating potable water from a source water, in accordance with one or more embodiments

In accordance with certain embodiments, the system for generating potable water may comprise two or more systems or certain components of the system, arranged in series. With particular reference to FIG. 4, a system for generating potable water from a source water may comprise first and second enclosed vessels (1140 and 1145, respectively). The system may comprise a first air distributor 1160 positioned within the first enclosed vessel 1140. The system may comprise a first condenser 1180 fluidly connected downstream of the first enclosed vessel 1140. The system may further comprise a second air distributor 1165 positioned within the second enclosed vessel 1145. The system may comprise a second condenser 1185 fluidly connected downstream of the second enclosed vessel 1145. The system may further comprise a first and second collection vessel (1200 and 1205, respectively) configured to collect the first and second potable water, respectively. The system may further comprise an exhaust air outlet 1340. In some embodiments, the system may comprise a heating unit 1120 and one or more pumps 1100.

The first and second enclosed vessels (1140 and 1145, respectively) may be configured to receive source water. The first air distributor 1160 may be configured to receive the heated air and bubble the heated air through the source water in the first enclosed vessel 1140 to produce a first saturated air. The first condenser 1180 may be configured to receive and cool the first saturated air to produce a first potable water condensate and a first cooled air. The second air distributor 1165 may be configured to receive the first cooled air and bubble the first cooled air through the source water in the second enclosed vessel 1145 to produce a second saturated air. The second condenser 1185 may be configured to receive and cool the second saturated air to produce a second potable water condensate and a second cooled air. The first and second collection vessel (1200 and 1205, respectively) may be configured to collect the first and second potable water, respectively.

Figure 5:
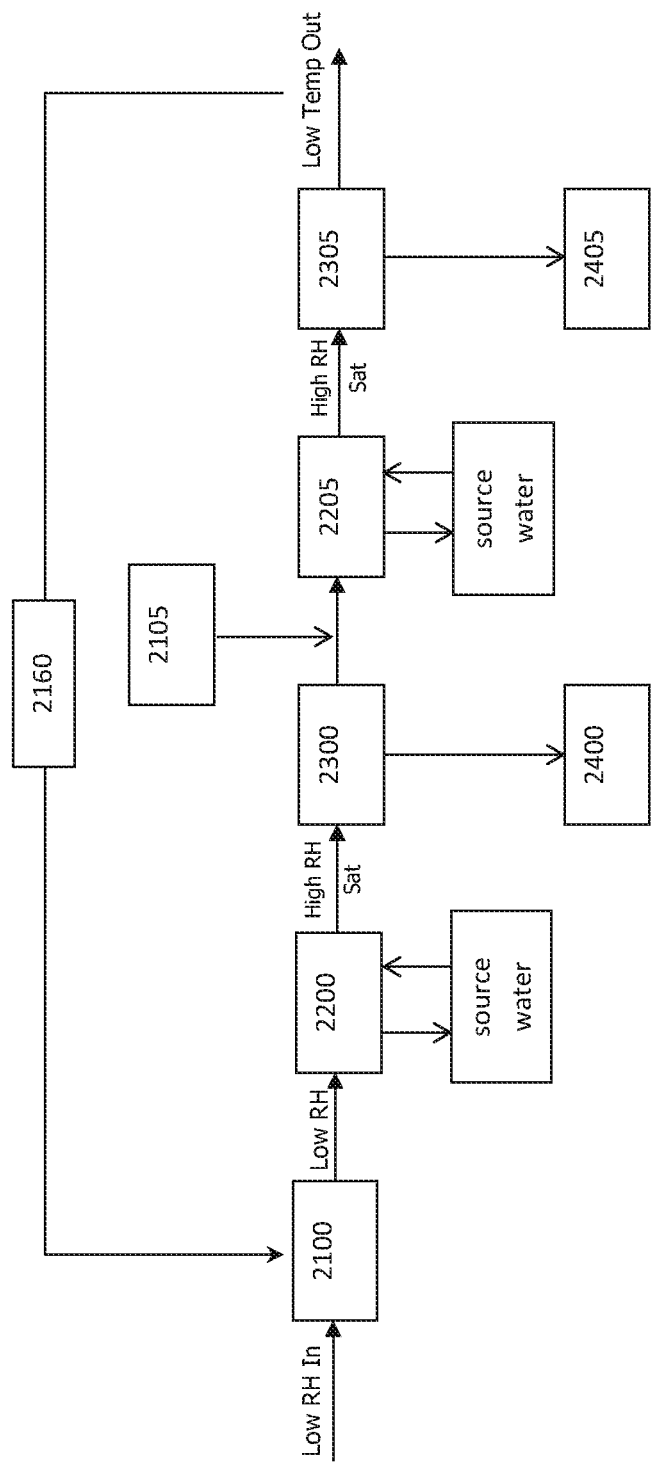
FIG. 5 is a box diagram of a method for generating potable water from a source water, in accordance with one or more embodiments.

In some embodiments, systems disclosed herein, for example the exemplary system shown in FIG. 4, may be configured to generate potable water by bubbling air through source water and cooling air in series. For instance, the method for generating potable water may comprise bubbling a first air and cooling the air followed by subsequent bubbling and cooling steps to increase potable water generation. Accordingly, as shown in FIG. 5, the method for generating potable water may comprise bubbling the heated air through a first source water to produce a first saturated air 2200. The method may further comprise cooling the first saturated air to produce a first potable water condensate and a first cooled air 2300. The method may comprise bubbling the first cooled air through a second source water to produce a second saturated air 2205. The method may further comprise cooling the second saturated air to produce a second potable water condensate and a second cooled air 2305. The method may further comprise collecting the first and second potable water condensate (2400 and 2405, respectively). In some embodiments, the method may comprise heating the first cooled air 2105 prior to bubbling the first cooled air through the second source water 2205. The method may comprise pumping or heating the ambient air or cooled air 2100. The method may further comprise pumping one or more of the ambient air, first saturated air, first cooled air, and second saturated air (not shown). In some embodiments, the method may further comprise reducing a velocity of the first saturated air or second saturated air prior to cooling the first or second saturated air (not shown). The velocity of the first or second saturated air may be reduced, for example, with an air diffuser.

Figure 6:
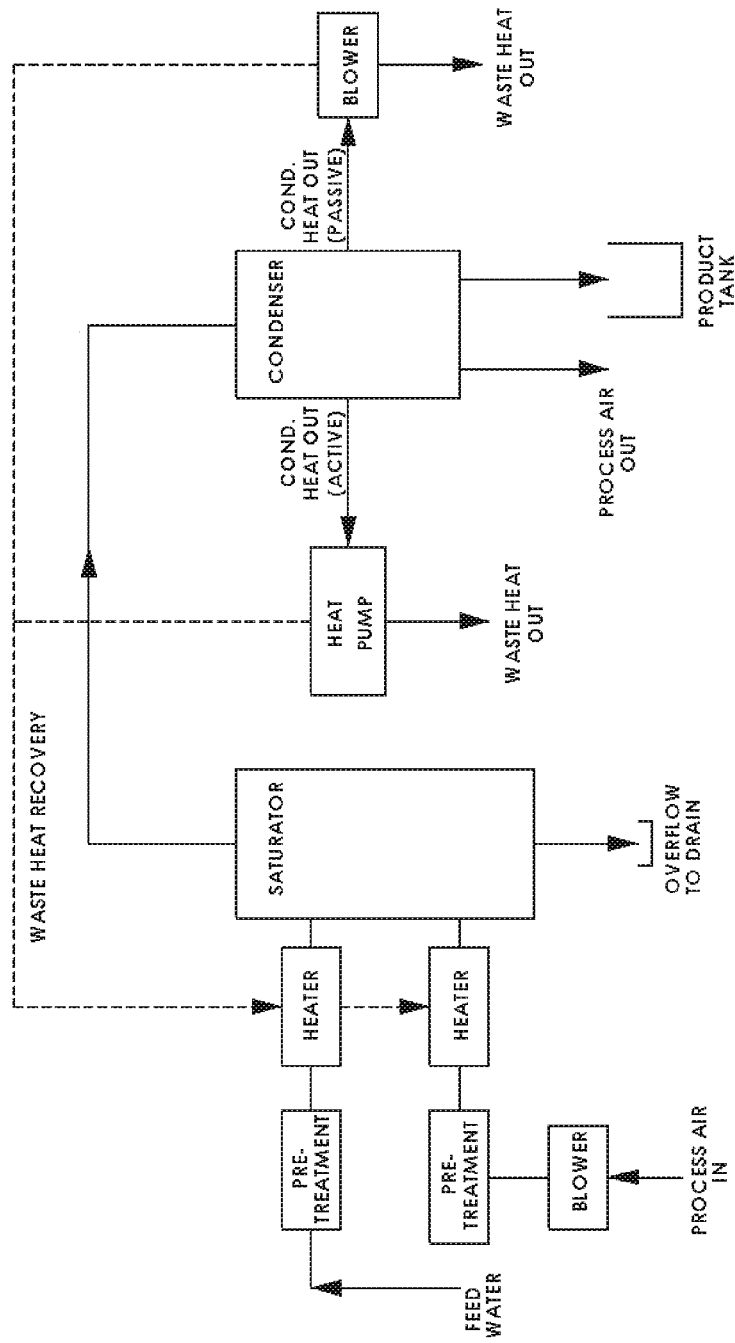
FIG. 6 is a box drawing of an alternate system for generating potable water, in accordance with one or more embodiments.

With particular reference to FIG. 6, a box diagram of an exemplary system for generating potable water is provided. In the exemplary embodiment of FIG. 6, process air (ambient air) is drawn from the surrounding environment by a circulation blower (pump), is pre-treated, and enters the saturator (enclosed vessel). Feed water (source water) is simultaneously pre-treated, heated, and enters the saturator. The enclosed vessel (in this example, the saturator) may be a bubbler, enhanced surface evaporator, or any other apparatus that evaporates source water into the heated air, such that the heated air is saturated and exits the enclosed vessel at or near saturation at a controlled temperature. The enclosed vessel contains an overflow outlet. The saturated air enters the condenser and is cooled actively (requires electrical energy), semi-passively (requires a reduced amount of electrical energy, for example, to drive a pump), or passively (does not require electrical energy). Active cooling may involve the use of a heat pump or radiator. Passive or semi-passive cooling may be achieved with the use of an enhanced heat transfer surface device, such as a heat exchanger and a blower, or a geothermal or ocean thermal cooling loop. Waste heat may be released into the environment or recycled to heat one or more of the process air (ambient air) or feed water (source water). The cooling of the saturated air causes the moisture to condense as product water (condensed potable water) which is stored in the product tank (collection vessel). In the exemplary embodiment of FIG. 6, the condensed potable water flows out of the condenser by gravity. Cooled air exits the condenser and the system through the process air outlet (exhaust outlet).

Figure 7:
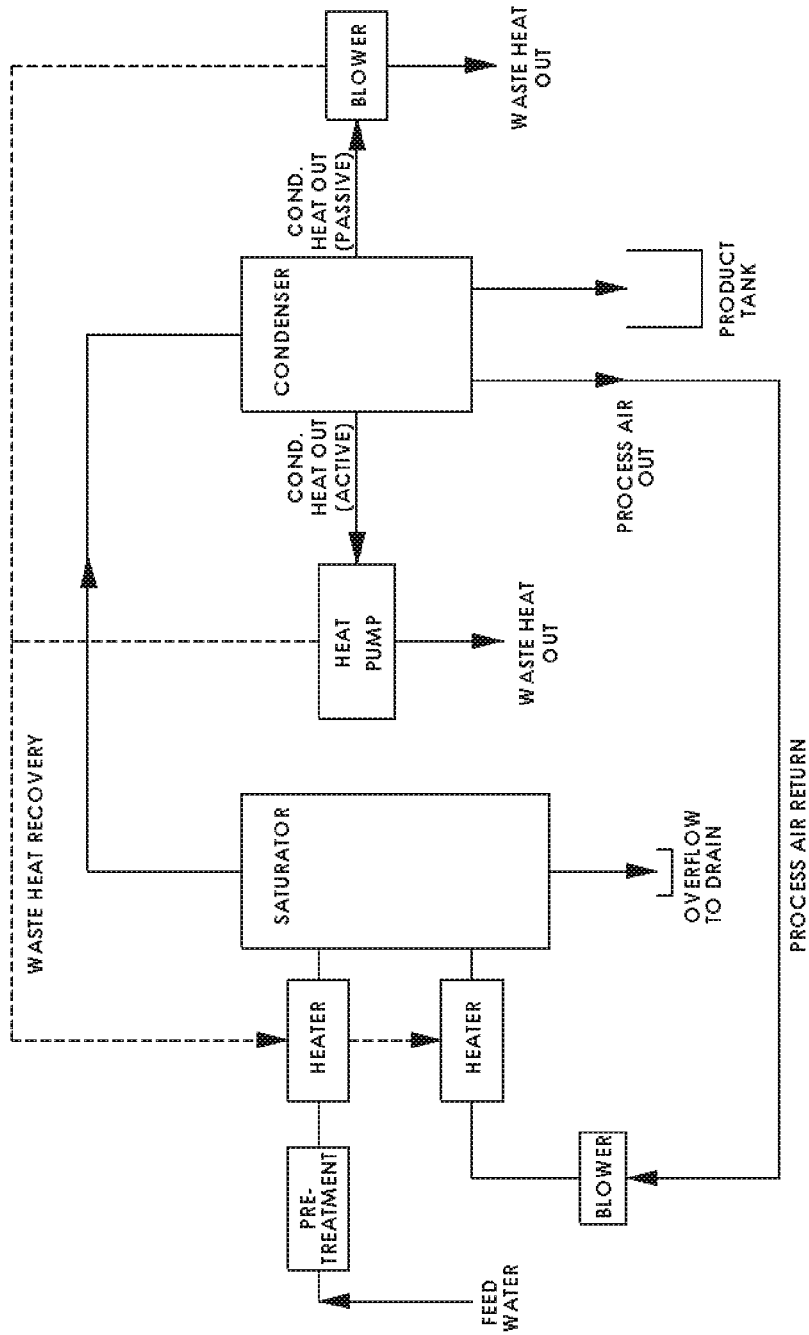
FIG. 7 is a box drawing of an alternate system for generating potable water, in accordance with one or more embodiments.

With particular reference to FIG. 7, a box diagram of an alternate exemplary system for generating potable water comprising a recycle subsystem is provided. The exemplary embodiment of FIG. 7 is similar to the exemplary embodiment depicted in FIG. 6, except the cooled air exiting the condenser is recycled via a process air return (recycle conduit) to the air blower. Waste heat may be released into the environment or recycled to heat one or more of the process air (ambient air), feed water (source water), or process air return (recycled air). Systems and methods disclosed herein may be employed in a motorized vehicle.

Motor vehicles, for example, cars, trucks, boats, tractors, and military vehicles, may contain elements that perform complex heating and cooling operations. Motor vehicles may also have access to different sources of contaminated water, for example, rainwater, seawater, waste irrigation water, and sewage. According to certain embodiments, systems and methods disclosed herein may produce potable water from sources of contaminated water utilizing the heating and cooling processes of motorized vehicles. The source water may be collected by gravity, for example, through an inlet conduit. Alternately, the system may include one or more pumps configured to collect the source water. The potable water condensate produced with such a system may be collected or delivered to a point of use, for example, an onsite point of use in the motorized vehicle.

Systems and methods disclosed herein may be applied to a dewatering or drying process. Certain processes require the removal of water. Source water may comprise or be accompanied by solids which are desirable to be collected. Source water may comprise dissolved substances that precipitate into solids in the enclosed vessel. Hydrated solids may also comprise water content which is desirable to be collected. Systems and methods disclosed herein may harness water from a source comprising water and a solids content. In some embodiments, the method of producing potable water may comprise bubbling or introducing heated air to a source water comprising a solids content to produce saturated air and partially dried solids, and collecting the partially dried solids. The partially dried solids may be collected and processed for use. In some embodiments, the partially dried solids are collected from the enclosed vessel through a solids outlet. The partially dried solids may be discarded with minimal water content. Systems and methods disclosed herein may employ a solids post-treatment to substantially dehydrate the partially dried solids. The dewatering or drying process may be combined with any of the methods disclosed herein. For instance, according to some embodiments, the dewatering or drying process may further comprise one or more of heating the ambient air, cooling the saturated air, collecting a water condensate, and/or collecting partially dried or precipitated solids. In some embodiments, the method comprises employing at least one natural energy source. Systems and methods disclosed herein may be setup as a batch or continuous process.

In some embodiments, the solids content in source water comprises minerals or precipitated minerals. Thus, systems and methods disclosed herein may be used in connection with a mineral drying process. Generally, mineral drying may be done by natural evaporation. However, bubbling air through a vessel of liquid containing a mineral desired to be collected may concentrate the mineral by vaporizing some of the liquid, and effectively produce precipitated mineral solids. The mineral solids may be collected as dried or partially dried solids, for example, through a solids outlet. The air that is bubbled through the liquid carries a purified liquid that could be harnessed as described herein, or it can be allowed to escape to the environment.

In some embodiments, the source water comprises waste solids. For instance, systems and methods disclosed herein may be used in connection with a zero liquid discharge process (ZLD). Generally, ZLD is employed in wastewater treatment to collect virtually all of the water from a wastewater sample. ZLD may be used to collect waste as a solid, for example, with little to no water effluent. Bubbling or introducing air into the retentate from a wastewater process may vaporize at least some of the residual water content and produce a dehydrated or partially dehydrated solid waste in a ZLD or ZLD-like process. The vaporized water may be collected and processed for further use. Such processing may be used, for example, to meet stringent waste discharge regulations or to recover valuable water content from wastewater sludge. In some embodiments, systems and methods disclosed herein may be used to dehydrate or partially dehydrate reverse osmosis (RO) concentrate. The collected water may be processed for further use. The dehydrated or partially dehydrated RO concentrate may be discarded or processed for further use.

According to certain embodiments, systems for generating potable water disclosed herein may be used to sequester carbon dioxide ($CO_2$) from the ambient air and/or treat ambient air for removal of contaminants.

In accordance with another aspect, there is provided a method of removing $CO_2$ from ambient air. In some embodiments, the method comprises bubbling ambient air through source water to produce treated air, discharging the treated air, discharging contaminant rich water, and optionally, discharging the used source water. In some embodiments, the method comprises collecting the treated air and delivering the treated air to a point of use. In some embodiments, the treated air may be heated or cooled. In some embodiments, the use of a catalytic mesh may be employed to enhance $CO_2$ conversion in the water and increase the $CO_2$ adsorption rate. For instance, the system may comprise a catalytic mesh positioned within the enclosed vessel and in fluid communication with the source water.

The method for removing $CO_2$ from ambient air may be combined with any of the methods disclosed herein. For instance, according to some embodiments, the method of removing $CO_2$ from ambient air, may further comprise one or more of heating the ambient air, cooling the treated air, and/or collecting a water condensate, for example, a $CO_2$ rich water. In some embodiments, the method comprises employing at least one natural energy source.

Bubbling ambient air through the source water may create a local air-rich water zone. While not wishing to be bound by any particular theory, when contacted with the water, it is believed that $CO_2$ in the air will react to form carbonic acid, which may react to form a proton and bicarbonate ion, in accordance with the following equation.

$$CO_2 + H_2O \leftrightarrow H_2CO_3 \leftrightarrow H^+ + HCO_3^-$$

The $CO_2$ may become dissolved in the water and react with other constituents to form solid species, for instance $CaCO_3$. The $CO_2$ rich water and solid contaminants may be flushed from the enclosed vessel. Accordingly, in some embodiments, the enclosed vessel may include a flush mechanism or other aperture to discard used source water and/or contaminants contained therein, for example, solid precipitate comprising contaminants and/or $CaCO_3$ or precipitated mineral solids. In some embodiments, the system may further include a treated air collection vessel or conduit.

Systems and methods disclosed herein may employ the use of a control module to measure or regulate some or all operations. For example, the system for generating potable water may comprise a control module and one or more sensors configured to measure at least one of temperature, pressure, relative humidity, water fill level, and flow rate of water or air within a system. The method for generating potable water may comprise measuring at least one of the aforementioned parameters, and adjusting at least one of the parameters in response to a measured result. The adjustment may be performed manually or automatically, for example by a control module.

EXAMPLES

The function and advantages of the embodiments discussed above and other embodiments of the invention can be further understood from the examples below, which further illustrate the benefits and/or advantages of the one or more systems and techniques of the invention but do not exemplify the full scope of the invention.

Example 1

Characteristics of the Different Process Air

Figure 8:
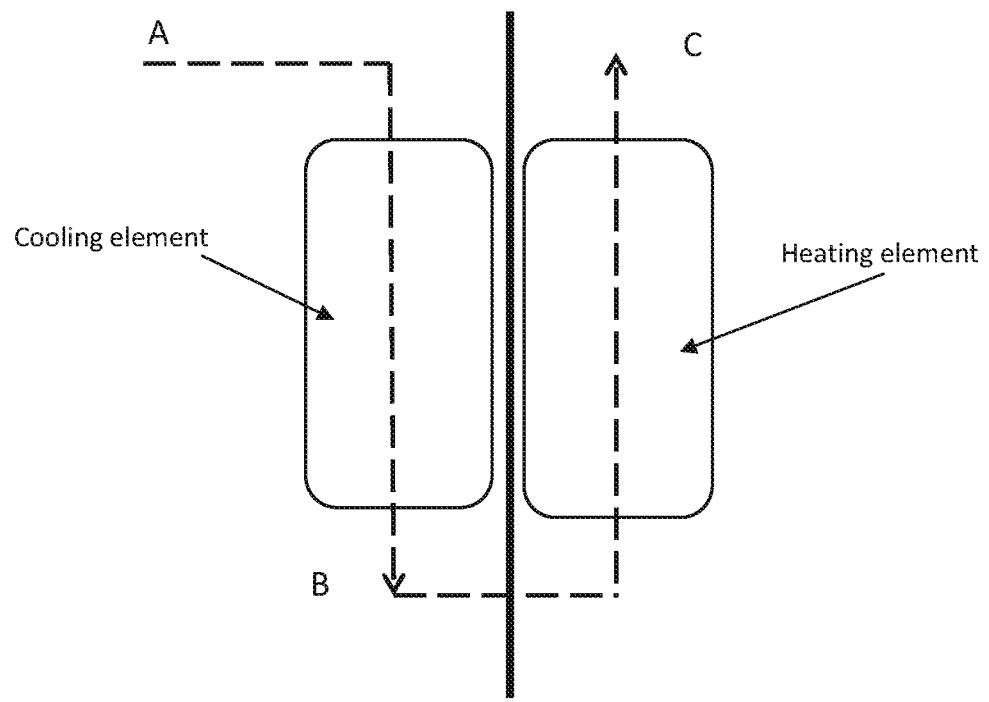
FIG. 8 is a schematic drawing of one exemplary embodiment of a system for generating potable water.

In an exemplary embodiment, saturated air is cooled producing cooled air, which in turn is heated producing recycled heated air. With particular reference to FIG. 8, saturated air exiting the enclosed vessel, for example, an evaporator, at point A may have a temperature of 86° F. and a relative humidity of 100%. Saturated air at point A is capable of carrying 27 g of $H_2O$ per kg of dry air. The saturated air is cooled with a cooling element, for example, a condenser. The cooled air exiting the condenser at point B may have a temperature of 77° F. and a relative humidity of 100%. The cooled air at point B is capable of carrying 20 g of $H_2O$ per kg of dry air. Accordingly, the cooling element extracts 7 g of $H_2O$ per kg of dry air.

The cooled air may be recycled within the system. In order to carry more water, the cooled air is heated with a heating element. The recycled heated air exiting the heated element at point C may have a temperature of 83° F. and a relative humidity of 90%. The recycled heated air has not yet picked up any additional moisture, and thus still carries 20 g of $H_2O$ per kg of dry air. The recycled heated air may become newly saturated and repeat the cycle.

Thus, systems and methods disclosed herein may be used to generate potable water by saturating dry air with water from a contaminated source water and subsequently cycling the air through a cooling and heating loop to extract potable water and become newly saturated repeatedly.

Example 2

Sea Water as a Source Water

One of the uses for the systems and methods disclosed herein is to efficiently generate potable water from sea water having a high salt concentration and one or more contaminants.

Sea water may be introduced into an enclosed vessel, for example by opening a large access point or valve. The access point or valve may contain a mesh, configured to keep trash and other large solid debris out of the enclosed vessel. Generally, there is a relatively higher wind source near the ocean, providing more ambient air. The ambient air may then be heated, introduced into the enclosed vessel through a bubbler, and bubbled through the sea water to produce highly saturated vapor.

The highly saturated vapor may then be cooled with a condenser. It may be favorable to utilize the cooler temperature of the nearby deep sea water to cool the vapor. Therefore, the water-saturated vapor may be pumped to a deeper level of the ocean to condense the air, and potable water condensate may be pumped back to the ocean surface, collected, and processed for further use. In order to provide electricity to the several pumps within the system or the condenser, the system may be connected to solar panels, wind turbines, a wave energy system, or an ocean thermal energy heat engine. The system described in this example utilizes natural energy to sustainably produce a high yield of potable water. This system may be employed in locations near the ocean that suffer from water shortages, for example in California.

Example 3

VOCs in Source Water

Volatile organic compounds (VOC) are undesirable in fresh water. In some instances, they may damage infrastructure and are not safe for consumption. Industrial waste water containing a high concentration of VOCs may require decontaminating before being discharged.

A source water comprising one or more VOCs may require a period of bubbling ambient air through the VOC laced water to quickly vaporize the VOCs and allow them to exit the system. Compared to water, the VOCs generally have higher molecular weight, much lower density, significantly lower melting and boiling points, and a significantly higher vapor pressure. Therefore, VOCs may be vaporized from the source water as soon as the bubbling begins. After a few minutes of bubbling, the vaporized VOCs in the saturated air exit the system through an outlet, leaving low VOC source water. After the initial bubbling, the condenser may be turned on to produce potable water from the remaining low VOC source water.

Alternately, the condenser may be employed to condense the vaporized VOCs, producing a VOC rich water condensate.

Thus, systems and methods disclosed herein may be used to generate potable water from water sources comprising a concentration of undesirable VOCs without requiring complicated decontamination and filtering steps. The systems and methods disclosed herein may also be used to generate a VOC rich water condensate.

Example 4

Naturally Distilled Water

Ambient air is pre-treated for removal of VOCs with a filter and/or activated carbon. The purified ambient air is bubbled through source water in an enclosed vessel of the system as described above. The condensed potable water produced with the system is high purity water that has been naturally distilled with the purified ambient air.

Condensed water produced with the purified ambient air may further be post-treated to achieve a desired purity. For example, the potable water condensate may be treated with a mixed bed ion exchange system to produce ultrapure water. The high purity water may be stored in an enclosed product water tank until further use, or directly delivered to a point of use.

For higher purity product water, the source water may be purified with an ion exchange system and or ultraviolet radiation before use in the system.

Example 5

$CO_2$ Adsorption

A system as disclosed herein capable of processing about 27,907,200 kg of ambient air in a 24 hour period produces about 475 $M^3$ of water, per day. With a 0.04% $CO_2$ concentration in ambient air, and a 1% minimum $CO_2$ sequester rate, the system may sequester about 111.63 kg of $CO_2$ from the ambient air in the 24 hour period. Thus, the system disclosed herein may sequester approximately 0.24 kg $CO_2$/$M^3$ per each kg/$M^3$ of water produced.

Example 6

Product Water Conductivity from Varying RH Air

Figure 11:
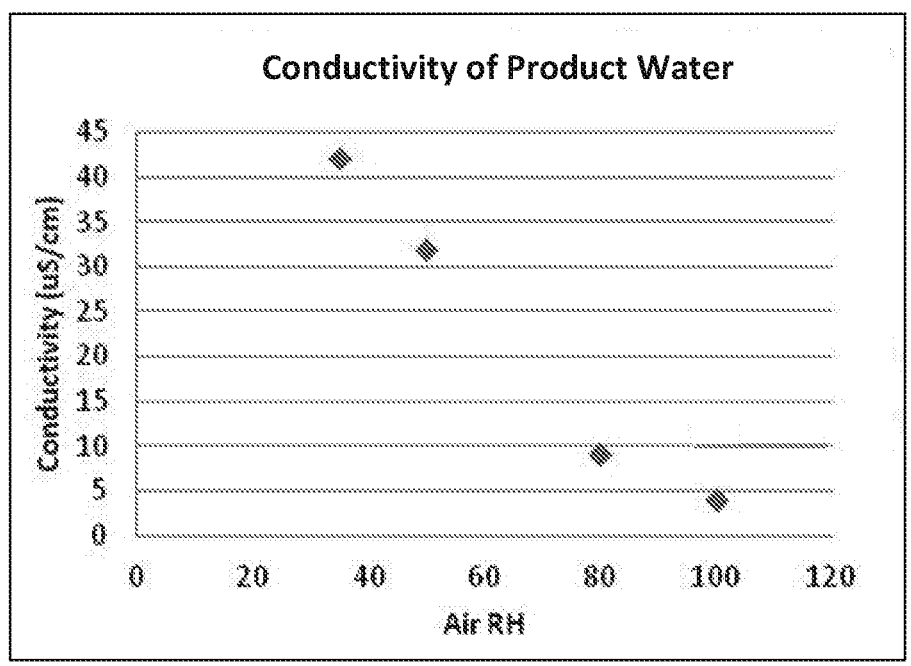
FIG. 11 is a graph of the conductivity of water produced by dehumidifying ambient air at various relative humidity values and condensing saturated air according to one or more embodiments disclosed herein.

A benchtop test was run to obtain condensed water from ambient air. Specifically, a dehumidifier was rinsed with deionized water and operated normally over varying RH % air samples. For each test, the dehumidifier was run for 2-4 hours. The RH % of the air did not change during the duration of each test. The conductivity of the water produced by this method was measured with a hand-held water conductivity meter. It was determined that the conductivity of water decreases as a function of increasing air RH. The results are presented in the graph of FIG. 11.

Example 7

Quality of Water Testing

A test was run to obtain condensed water from saturated ambient air, as disclosed herein. Ambient air was saturated by bubbling through a salt water sample. The salt water was maintained at 84° F. for saturation of the ambient air. The system contained silicon tubing and polyethylene (PE) tubing. A RH and temperature sensor was positioned at the inlet of the condenser. The water was bubbled about 1 to 1.5 inches below the surface of the salt water, in an enclosed container having an outlet for saturated air. The air was saturated to about 100% RH. The test was run for 4 hours. The resultant product water samples were sent to an analytical lab for analysis. The results of the analysis are shown in Table 1 below.

TABLE 1

Analytical results for product water (potable water condensate), where "ND" is not-detected and "MDL" is method detection limit In the fifth column (left to right) the % reduction was calculated by zeroing the value at the method detection limit. In the sixth column (left to right) the % reduction was calculated by zeroing the value at 0.

| Parameter | Feed Water | Product Water | Units | % Reduction based on ND = MDL | % Reduction Based on ND = 0 |
|---|---|---|---|---|---|
| Conductivity | 2800 | 3.682 | µS/cm | 99.856043 | 99.97923795 |
| Total Anions | 25 | 0.057 | meq/L | 99.772 | x |
| Total Cations | 24 | 0.027 | meq/L | 99.8875 | x |
| pH | 7.8 | 6.1 | — | x | x |
| Total Hardness | 96 | ND | mg/L | 100 | 100 |
| TDS | 1462 | 1.8 | mg/L | 99.862139 | 99.97923795 |
| Alkalinity (as $CaCO_3$) | 93 | ND | mg/L | 98.602151 | 100 |
| Hydroxide (as OH) | ND | ND | mg/L | x | x |
| Carbonate (as $CO_3$) | 113 | ND | mg/L | 99.292035 | 100 |
| Bicarbonates ($HCO_3$) | ND | ND | mg/L | x | x |
| Arsenic | 0.0029 | ND | mg/L | 92.251724 | 100 |
| Boron | .089* | ND | mg/L | 85.569029 | 100 |
| Calcium | 17 | ND | mg/L | 99.529412 | 100 |
| Iron | ND | ND | mg/L | 0 | 100 |
| Magnesium | 13 | ND | mg/L | 99.846154 | 100 |
| Manganese | ND | ND | mg/L | 0 | 100 |
| Potassium | 1.4 | ND | mg/L | 85.714286 | 100 |
| Silica (as $SiO_2$) | 36 | ND | mg/L | 99.984444 | 100 |
| Sodium | 520 | 0.62* | mg/L | 99.98868 | 99.98855979 |
| Zinc | 0.042 | 0.021 | mg/L | 50 | 50 |
| Sulfates (as $SO_4$) | 7.5 | 0.16* | mg/L | 98.666667 | 100 |
| Fluoride | ND | ND | mg/L | x | x |
| Nitrates | 1.2 | ND | mg/L | 100 | 100 |
| Chloride | 810 | 1.2 | mg/L | 99.851852 | 99.85185185 |

The product water contains 85% to 100% less of each of the detected contaminants than the feed water. Accordingly, saturating ambient air may produce a high purity product water. Saturating ambient air can also remove ionic impurities from the condensed water.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of a system for generating potable water. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve generating potable water from a source water. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A system for generating potable water from a source water, comprising:
   an enclosed vessel configured to receive source water;
   an ambient air conduit positioned upstream from an air distributor;
   a heating unit positioned within the ambient air conduit to receive and heat ambient air to produce heated air;
   the air distributor positioned within the enclosed vessel to receive the heated air and bubble the heated air through the source water in the enclosed vessel to produce saturated air, the air distributor constructed and arranged to control at least one of air bubble size and concentration of air bubbles;
   a condenser fluidly connected downstream of the enclosed vessel positioned to receive and cool the saturated air to produce a potable water condensate and cooled air;
   a collection vessel fluidly connected downstream of the condenser and positioned to collect the potable water condensate; and
   an exhaust air outlet fluidly connected downstream of the condenser.

2. The system for generating potable water of claim 1, wherein at least one of the air distributor and the condenser is electrically connected to receive power from a natural energy source.

3. The system for generating potable water of claim 1, further comprising a pump positioned upstream of the enclosed vessel to pump ambient air to the air distributor.

4. The system for generating potable water of claim 3, further comprising a recycle subsystem extending between the condenser and the air distributor, the recycle subsystem positioned to deliver at least some of the cooled air to the air distributor.

5. The system for generating potable water of claim 4, wherein the recycle subsystem further comprises a recycle heating unit.

6. The system for generating potable water of claim 3, further comprising a recycle subsystem extending between the condenser and the heating unit, the recycle subsystem positioned to deliver at least some of the cooled air to the heating unit.

7. The system for generating potable water of claim 3, wherein the pump is operable to control air pressure of bubbles.

8. The system for generating potable water of claim 1, further comprising a post-treatment subsystem comprising one or more systems selected from the group consisting of a membrane filter system, a carbon filter system, an ion exchange system, and an ultraviolet decontaminant system, fluidly connected to the collection vessel and positioned to remove contaminants from the potable water condensate.

9. The system for generating potable water of claim 1, wherein the air distributor is a fine bubble air distributor constructed and arranged to provide fine bubbles substantially evenly throughout the source water.

10. The system for generating potable water of claim 1, wherein the enclosed vessel is constructed and arranged to control at least one of volume of the source water, obstacles for rising bubbles, and height of the source water.

11. The system for generating potable water of claim 1, wherein the condenser is a geothermal cooling condenser or an ocean water thermal energy condenser.

12. A method for generating potable water from a source water comprising:
   heating ambient air to a temperature of between about 65° F. and about 180° F. to produce heated air;
   bubbling the heated air through source water to produce a saturated air;
   cooling the saturated air to produce a potable water condensate and a cooled air;
   collecting the potable water condensate; and
   recycling at least some of the cooled air and heating the at least some of the cooled air to produce a recycled heated air and bubbling the recycled heated air through the source water.

13. The method for generating potable water of claim 12, wherein cooling the saturated air comprises condensing the saturated air with a condenser.

14. The method for generating potable water of claim 12, further comprising post-treating the potable water condensate to remove contaminants, wherein post-treating the potable water comprises disinfecting the potable water condensate with ultraviolet light or filtering the potable water condensate with at least one of a membrane filter, a carbon filter, and an ion exchange resin.

15. The method for generating potable water of claim 14, wherein post-treating the potable water comprises post-treating to meet a standard requirement for one or more of drinking water, laboratory deionized water, laboratory ultrapure water, and agricultural irrigation water.

16. The method of generating potable water of claim 12, comprising bubbling the heated air through source water to produce partially dried solids and collecting the partially dried solids.

17. The method of generating potable water of claim 16, wherein the partially dried solids comprise minerals.

18. The method of generating potable water of claim 16, wherein the partially dried solids comprise wastewater concentrate.

19. The method of generating potable water of claim 12, further comprising controlling residence time of the heated air through the source water by controlling at least one of air bubble size, concentration of air bubbles, air pressure of bubbles, volume of the source water, obstacles for rising bubbles, and height of the source water.

20. A system for generating potable water from a source water, comprising:
   an enclosed vessel configured to receive source water;

a pre-treatment subsystem comprising at least one of a source of a chlorine compound and one or more membrane filters, fluidly connected upstream of the enclosed vessel;

an ambient air conduit positioned upstream from an air distributor;

a heating unit positioned within the ambient air conduit configured to receive and heat ambient air to produce heated air;

the air distributor positioned within the enclosed vessel configured to receive the heated air and bubble the heated air through the source water in the enclosed vessel to produce saturated air;

a condenser fluidly connected downstream of the enclosed vessel configured to receive and cool the saturated air to produce a potable water condensate and cooled air;

a collection vessel fluidly connected downstream of the condenser and configured to collect the potable water condensate; and an exhaust air outlet fluidly connected downstream of the condenser.

21. A method for generating potable water from a source water comprising:

heating ambient air to produce heated air;

pre-treating a source water to remove contaminants;

bubbling the heated air through the source water to produce a saturated air;

cooling the saturated air to produce a potable water condensate and a cooled air;

collecting the potable water condensate; and recycling at least some of the cooled air and heating the at least some of the cooled air to produce a recycled heated air and bubbling the recycled heated air through the source water.

22. The method of claim 21, wherein pre-treating the source water comprises filtering the source water with a membrane filter or disinfecting the source water by adding a chlorine compound to the source water.

* * * * *